United States Patent [19]

Iwatsuka et al.

[11] Patent Number: 5,691,845
[45] Date of Patent: Nov. 25, 1997

[54] OPTICAL ISOLATOR, OPTICAL ISOLATOR WITH FIBER AND METHOD FOR MAKING THE SAME

[75] Inventors: Shinji Iwatsuka, Oamishirasato-machi; Yoichi Kanagawa, Narita; Kenjiro Hata, Matsudo; Makoto Sekijima, Ichikawa, all of Japan

[73] Assignee: TDK Corporation, Tokyo, Japan

[21] Appl. No.: 513,286

[22] Filed: Aug. 10, 1995

[30] Foreign Application Priority Data

Aug. 12, 1994 [JP] Japan .................................. 6-210667
Jun. 28, 1995 [JP] Japan .................................. 7-162478

[51] Int. Cl.$^6$ ...................................................... G02B 5/30
[52] U.S. Cl. .......................... 359/497; 359/484; 359/495; 385/11; 385/15
[58] Field of Search ............................. 359/483, 484, 359/494, 495, 497; 385/11, 15, 31

[56] References Cited

U.S. PATENT DOCUMENTS

| | | | |
|---|---|---|---|
| 4,375,910 | 3/1983 | Seki | 359/484 |
| 5,315,431 | 5/1994 | Masuda et al. | 359/281 |
| 5,359,689 | 10/1994 | Iwatsuka et al. | 385/73 |
| 5,381,261 | 1/1995 | Hirai et al. | 359/282 |
| 5,446,813 | 8/1995 | Lee et al. | 385/31 |

FOREIGN PATENT DOCUMENTS

| | | | |
|---|---|---|---|
| 59-176721 | 10/1984 | Japan | 359/484 |
| 1-219816 | 9/1989 | Japan . | |
| 1-219817 | 9/1989 | Japan . | |
| 1-219818 | 9/1989 | Japan . | |
| 2-93409 | 4/1990 | Japan . | |
| 3-171029 | 7/1991 | Japan . | |

OTHER PUBLICATIONS

Kazuyoshi Sato et al.; 1988 Spring Meeting of the "Society of Electronic Information and Communication of Japan," Article No. C-477, pp. 1-447.

Primary Examiner—Paul M. Dzierzynski
Assistant Examiner—Darren E. Schaberg
Attorney, Agent, or Firm—Panitch Schwarze Jacobs & Nadel, P.C.

[57] ABSTRACT

In an optical isolator including first and second birefringent plates whose optical axes are angularly different and a Faraday rotator inserted therebetween having a Faraday rotation angle of $\theta_f$, (1) the angles of the optical axes of the first and second birefringent plates are so set that a forward incident polarized light passes through the first and second birefringent plates both as ordinary lights or both as extraordinary lights, and the relationship $\theta_f+\phi_{\mathit{eff}}=90°$ is satisfied when an actually used incident polarized light is incident in an oblique direction, or (2) the angles of the optical axes of the first and second birefringent plates are so set that a forward incident polarized light passes through one of the first and second birefringent plates as an ordinary light and the other birefringent plate as an extraordinary light, and the relationship $\theta_f-\phi_{\mathit{eff}}=0°$ is satisfied. Alternatively, cases when the magnetization of the Faraday rotator is reversed are compared and the direction of the magnetization which satisfies (1) and (2) as close as possible is selected. A good isolation is obtained by the present invention.

12 Claims, 22 Drawing Sheets

OPTICAL ISOLATOR, OPTICAL ISOLATOR WITH FIBER AND METHOD FOR MAKING THE SAME

BACKGROUND OF THE INVENTION

1. Field of the Invention

The present invention relates to an optical isolator used in a semiconductor laser module or the like, and, more particularly, to an optical isolator, an optical isolator provided with a fiber and an method for making the same which utilizes birefringence plates as polarizers.

2. Prior Art

An optical isolator comprises a pair of polarizers whose relative optical angle (the relative angle between the directions of polarization of lights passing straight through the polarizers in the direction normal to the incident surfaces of the polarizers) is set at about 45 degrees and a Faraday rotator plate having a Faraday rotation angle of about 45 degrees is inserted between the polarizers and these members are fixed to each other. This optical isolator permits passage of light in the forward direction therethrough but inhibits return light in the reverse direction. Such an optical isolator is one of the key devices in optical communication and it is desired to manufacture such devices on a large scale at a low cost.

For example, JP-A-03-171029 proposed optical isolators which are produced by bonding a pair of large plates of polarizers made of a polarizing glass material together with an interposing Faraday rotator between them, and thereafter cutting the laminate into a number of optical isolator units of a desired shape. The isolators of this type are mass-productive but have a problem that the polarizing glass is expensive.

On the other hand, JP-A-01-219818 discloses an optical isolator which utilizes birefringent plates as polarizers. When the two birefringent plates are bonded together with an interposing Faraday rotator to form an optical isolator, the relative optical angle between the two birefringent plates is adjusted while admitting a laser light onto the incident surface of the optical isolator in the direction normal to the surface until a proper angle is reached and then the relative position of the members is fixed. The birefringent plates used as polarizers in this type of optical isolator are easy to manufacture and accordingly it is possible to lower the cost.

Inexpensive optical isolators may be mass produced by combining the features of the techniques disclosed in JP-A-03-171029 and JP-A-01-219818, namely, by using a pair of birefringent plates of a large surface area, allowing a laser light entering the incident surface of the optical isolator in the direction normal to the surface prior to bonding them with a Faraday rotator, adjusting the relative angle of the C-axes (optical axes) of the birefringent plates, fixing the angle and thereafter cutting the laminate into unit isolators.

A good isolation is obtained with the above-mentioned optical isolator using birefringent plates when the incident laser light is normal to the surface of the optical isolator. However, the laser light is usually allowed to be obliquely incident on the surface of the optical isolator so as to prevent the light reflected by the optical isolator per se from returning to the incident side (For example, reference should be made to the article No. "C-447" of the collected papers for the 1998 Spring Meeting of the Society of Electronic Information and Communication of Japan, pp 1–447). If the polarizers are birefringent plates, the reverse light quantity is rather increased depending on the direction of incident light even if the reverse light has been adjusted to the minimum for the incident light normal to the surface of the optical isolator.

DETAILED EXPLANATION OF THE INVENTION

With respect to an oblique incident light and the relative optical angle between a pair of birefringent plates:

The relationship between an oblique incident light and a relative optical angle between a pair of birefringent plates (angle between the plane of polarization of a light passing as an ordinary light through the first birefringent plate and the plane of polarization of a light passing as an ordinary light through the second birefringent plates) will be explained by making reference to the isolator element shown in FIG. 1. In FIG. 1, the optical isolator element 11 is composed of a first birefringent plate 1, a Faraday rotator 3. A second birefringent plate 2, bonded together with an adhesive and a magnetic field is usually applied to the Faraday rotator 3 to form an optical isolator. Mutually orthogonal axes X and Y are taken in the incident surface S1 (or a plane parallel to the incident surface S1) of the optical isolator and a Z axis is taken normal to the surface of the optical isolator element. The directions of C-axes (optical axes) of the two birefringent plates made of rutile may be defined by angles θ's from the Z axis (first birefringent plate: $\theta 1$, second birefringent plate: $\theta 2$) and the angles $\phi$ from the X-axis in the X-Y plane (first birefringent plate: $\phi 1$, second birefringent plate: $\phi 2$). It is assumed that the angular ranges of $\theta 1$ and $\theta 2$ satisfies $0° \leq \theta 1$ and $\theta 2 \leq 90°$ and those of $\phi 1$ and $\phi 2$ satisfy $0° \leq \phi 1$, $\phi 2 \leq 360°$.

Thus, the direction a1 of the C-axis of the first birefringent plate 1 is ($\theta 1$, $\phi 1$) and the direction 2a of the C-axis of the first birefringent plate 1 is ($\theta 2$, $\phi 2$).

Further, the relative optical angle $\phi$ ($0° < \phi < 90°$) is given by the following relation.

$$\phi = |\phi 2 - \phi 1 - n \times 180°| \tag{1}$$

where if $-360° < (\phi 2 - \phi 1) < -270°$: n=-2 if $-270° < (\phi 2 - \phi 1) < 90°$ (but $\phi 2 - \phi 1 \neq -180°$): n=-1 if $-90° < (\phi 2 - \phi 1) < 90°$ (but $\phi 2 - \phi 1 \neq 0°$): n=0 if $90° < (\phi 2 - \phi 1) < 90°$ (but $\phi 2 - \phi 1 \neq 180°$): n=1 if $270° < (\phi 2 - \phi 1) < 360°$: n=2

In other words, the direction 2a of the C-axis of the second birefringent plate is obtained by rotating the C-axis of the second birefringent plate 2 in the X-Y plane clockwise or counterclockwise about the light axis by $\phi$ or $180°-\phi$ ($0° < \phi < 90°$) with respect to the C-axis of the first birefringent plate 1. The reason why there are two cases $\phi$ and $180°-\phi$ is that for the same relative angle $\phi$ there are two cases where the C-axis of the second birefringent plate is rotated by $\phi$ (the C-axis of the second birefringent plate is 32) and by $180°-\phi$ (the C-axis of the second birefringent plate is 33) with respect to the C-axis 31 of the first birefringent plate as shown in FIG. 25. Incidentally, $\theta 1$, $\theta 2$, $\phi 1$ and $\phi 2$ of the optical isolator illustrated in FIG. 1 are fixed by adhesion with the following settings.

($\theta 1$, $\phi 1$)=(45°, 0°)

($\theta 2$, $\phi 2$)=(45°, 45°)

Also, as is clear from the above $\phi 1$ and $\phi 2$, the relative angle between the two birefringent plates $\phi$ (=$\phi 2 - \phi 1$) is set at 45°. That is to say, the direction of the C-axis 2a of the second birefringent plate is set in the direction obtained by rotating the the C-axis 1a of the first birefringent plate by 45° in the X-Y plane.

By varying the incident direction (θin, φin) of the laser light 4 on this optical isolator, the angle between the plane of polarization of the light passing through the first birefringent plate as an ordinary light and the plane of polarization of the light passing through the second birefringent plate as an ordinary light, namely the effective relative angle φeff will vary to a significant degree as shown in FIG. 2, where the direction of incidence (θin, φin) is defined by the angle θ in as measured from Z-axis and the angle φin as measured from the X-axis in the X-Y plane as is the case in direction of the C-axis.

In the following, the relative optical angle between a pair of birefringent plates is assumed to be φ when a laser light is incident on the surface of the optical isolator in the direction normal to the surface, and the effective relative optical angle of them is assumed to be φeff when the laser light is incident on the surface in the oblique direction.

With respect to the relationship between the isolation property and the relative optical angle of a pair of birefringent plates:

Assuming that the relative optical angle of the pair of birefringent plates is φ, the Faraday rotation angle is θf and the polarizers and the Faraday rotator are ideal elements, we obtain the following forward transmissivity Tf and backward transmissivity Tb for (A) an optical isolator which permits the forward incident light to pass through the first and second birefringent plates both as ordinary lights, or (B) an optical isolator which permits the forward incident light to pass through the first and second birefringent plates both as extraordinary lights.

$$Tf=\cos^2(\theta f-\phi) \quad (2)$$

$$Tb=\cos^2(\theta f+\phi) \quad (3)$$

As this Tf corresponds to the ordinary light component F in the second birefringent plate in FIG. 26(a), we obtain $$Tf=\cos^2\Delta\theta$$

where Δθ=(90°−φ)+θf−90°=θf−φ and accordingly we obtain the equation (2) above.

On the other hand, as Tb corresponds to the ordinary light component B in the first birefringent plate in FIG. 26(b), we obtain $$Tb=\cos^2(\phi+\theta f)$$

which is the equation (3).

The same equations (2) and (3) hold good in the case (B), too, as in the case (A).

Incidentally, 4a in FIG. 26 indicates the plane of polarization (direction of linear polarization) of the laser light in the first birefringent plate and 4b indicates the plane of polarization (direction of linear polarization) of the laser light in the second birefringent plate (direction of the linearly polarized light) and 1a indicates the C-axis (optical axis) of the first birefringent plate and 2a indicates the C-axis (optical axis) of the second birefringent plate.

Further, isolation Iso(dB) is defined by the following equation.

$$Iso=-10\log_{10}(Tb/Tf) \quad (4)$$

As is evident from the equations (2) to (4), when θf=φ=45° we have

Tf=1, Tb=0, Iso=∞(dB), which exhibit an isolation for an ideal optical isolator. It should be noted that θf+φ=90° is the most important because the elimination of the backward transmissivity Tb is the most conducive to the improvement in the isolation property.

However, with the optical isolator which uses birefringent plates as the polarizers, even if the conditions are adjusted to satisfy the relation θf+φ=90° for a normal incident light, the isolation is reduced (namely, the increase in the backward transmissivity) for an actually used oblique incident light because φ and φeff do not coincide with each other and thus the relation becomes φf+φeff≠90°.

Accordingly, it is necessary to design an optical isolator which uses birefringent plates as polarizers in such manner that it satisfies the relation φf+φeff=90°, taking account of the actually used oblique direction of incidence.

The above description is directed to the cases where the forward incident light satisfies the conditions (A) and (B) above. Similar consideration is made in the following cases.

(C) An optical isolator which permits the forward incident light to pass through the first birefringent plate as an ordinary light and the second birefringent plate as an extraordinary light, or (D) An optical isolator which permits the forward incident light to pass through the first birefringent plate as an extraordinary light and the second birefringent plate as an ordinary light, and we obtain the following conditions.

$$Tf=\sin^2(\theta f+\phi) \quad (5)$$

$$Tb=\sin^2(\theta f-\phi) \quad (6)$$

Since Tf corresponds to the extraordinary light component F in the second birefringent plate shown in FIG. 27(a), we obtain $$Tf=\sin^2(\phi+\theta f)$$

which is the equation (5).

On the other hand, since Tb corresponds to the ordinary light component B in the first birefringent plate shown in FIG. 27(b), we obtain $$Tf=\sin^2\Delta\theta$$

where Δθ=(90°−φ)+θf−90°=θf−φ, which is the equation (6).

The above explanation for the case (C) also holds good for the case (D). Incidentally, 4a of FIG. 27 shows the plane of polarization (direction of linear polarization) of the laser light in the first birefringent plate, 4b shows the plane of polarization (direction of linear polarization) in the second birefringent plate, 1a is the C-axis(optical axis) of the first birefringent plate and 2a is the C-axis(optical axis) of the second birefringent plate.

Accordingly, as is evident from the equations (5) and (6), it is necessary to satisfy the condition θf−φ=0° in order to eliminate the backward transmissivity Tb and the actual optical isolator should be designed to satisfy the relation θf−φeff=0° by taking account of the actually used direction of incidence (oblique incident direction).

As explained, when the following conditions are met, the isolation is improved.

(M1) With an optical isolator wherein a forward incident light satisfies the condition (A) or (B), it is preferred for the isolator to satisfy the condition θf+φeff=90° and it is better if θf=φeff is also satisfied because the forward transmissivity Tf is also increased.

(M2) With an optical isolator wherein a forward incident light satisfies the condition (C) or (D), it is preferred for the isolator to satisfy the condition $\theta f=\phi eff$ and it is better if $\theta f+\phi eff=90°$ is also satisfied because the forward transmissivity Tf is also increased.

As is clear from the above (M1) and (M2), an optical isolator which has been designed to satisfy $\theta f+\phi eff=90°$ and $\theta f=\phi eff$ (that is, $\theta f=\phi eff=45°$) shows the best isolation.

However, even with an optical isolator of a design having $\theta f=\phi eff=45°$ ($\theta f$ is usually adjusted to $\theta f=45°$ at the central wavelength of use and the central temperature of use), there is a possibility that the value of $\phi$ eff is deviated from the designed value when the pair of the birefringent plates and the Faraday rotator are bonded together and even in the case that the respective elements are bonded as originally designed the isolator element (consisting of a pair of the birefringent plates and the Faraday rotator bonded together), $\phi eff$ can be varied due to variation in its fixing angle on a holder. As a result, some of the conventional optical isolators do not provide a sufficient isolation property.

Namely, even if the angle between the C-axes (optical axes) of the two birefringent plates comprising a part of the optical isolator is fixed, the relative optical angle of them as felt by the actual incident light onto the optical isolator (the angle between the plane of polarization of the light which passes through the first birefringent plate as an ordinary light and the plane of polarization of the light which passes through the second birefringent plate as an extraordinary light) varies depending on the angle (direction) of incidence of the laser beam onto the incident surface of the light.

Accordingly, an object of the present invention is to provides an optical isolator, an optical isolator with an optical fiber and a method for manufacturing them, wherein the optical isolator uses a pair of birefringent plates as polarizers and the relative optical angle between the pair of birefringent plates felt by an actual incident light is adjusted to and fixed at a desired angle, whereby the isolation characteristic and the production yield are improved.

Another object of the present invention is to provide an optical isolator, an optical isolator with an optical fiber and a method for manufacturing them, wherein the setting of the optical isolator element by bonding a pair of birefringent plates and a Faraday rotator together (setting is effected by rotating them in a plane parallel to the incident surface) is modified to change the relative optical angle of the pair of birefringent plates felt by an actual incident light, whereby the isolation characteristic and the production yield are improved.

A further object of the present invention is to provide an optical isolator, an optical isolator with an optical fiber and a method for manufacturing them, wherein the direction of magnetization of a Faraday rotator comprising a part of the optical isolator is reversed, whereby the isolation characteristic and the production yield are improved.

Incidentally, the reason why the effect of the direction of incidence on the isolation characteristic was not discussed in the prior art is that it was difficult to mount a device for measuring the return light on a system which comprised an optical isolator element, a semiconductor laser, a lens system, an optical fiber, etc. In JP-A-2-93409, with respect to the case where the two polarizers were comprised of polarizing beam splitters, the relation between the variation in the direction of incidence and the variation in the isolation property was pointed put. However, the system of this reference defines the relative angle of the directions normal to the two polarization beam splitters in such manner that the variation of the direction of the incidence onto the optical isolator element causes as slight variation in the isolation as possible when the isolator element is assembled together with an optical fiber or a lens system, but does not aim at obtaining the best isolation when assembling is carried out.

SUMMARY OF THE INVENTION

The optical isolators according to the present invention has the following four types.

(M1) An optical isolator in which a forward incident polarized light passes through the first and second birefringent plates respectively as ordinary lights.

(M2) An optical isolator in which a forward incident polarized light passes through the first and second birefringent plates respectively as extraordinary lights.

(M3) An optical isolator in which a forward incident polarized light passes through the first and second birefringent plates respectively as an ordinary light and an extraordinary light.

(M4) An optical isolator in which a forward incident polarized light passes through the first and second birefringent plates respectively as an extraordinary light and an ordinary light.

That is, (M1) and (M2) are isolators in which a light passes both as ordinary lights or both as extraordinary lights through the first and second birefringent plates, while (M3), (M4) are isolators in which a light passes as an ordinary light through one of the first and second birefringent plates and as an extraordinary light through the other.

As one aspect, the present invention provides an optical isolator including a first and second birefringent plates so arranged that the plane of polarization of a light passing through the first birefringent plate as an ordinary light and the plane of polarization of a light passing through the second birefringent plate as an ordinary light are in non-parallel with each other and a Faraday rotator inserted between the first and second birefringent plates for rotating the plane of polarization of a light incident on the rotator through a fixed angle, characterized in that, when the angles of the optical axes of the first and second birefringent plates are so set that a forward incident polarized light passes through the first and second birefringent plates respectively as ordinary and ordinary lights or extraordinary and extraordinary lights, assuming that, when an actually used incident polarized light is incident in an oblique direction, $\phi_{\it{eff}}$ is the angle between the plane of polarization of the light passing through the first birefringent plate as an ordinary light and the plane of polarization of the light passing through the second birefringent plate as an ordinary light and that $\theta_f$ is the angle of the Faraday rotation of said Faraday rotator at its central temperature of use and at its central wavelength of use, the thickness of the Faraday rotator or the relative angle between the birefringent plates is adjusted to satisfy the relationship $\theta_f+\phi_{\it{eff}}=90°$.

The present invention also provides an optical isolator having a construction similar to the above optical isolator, characterized in that, when the angles of the optical axes of the first and second birefringent plates are so set that a forward incident polarized light passes through the first and second birefringent plates respectively as an ordinary light and an extraordinary light or respectively as an extraordinary light and an ordinary light, the thickness of the Faraday rotator or the relative angle between the birefringent plates is adjusted to satisfy the relationship $\theta_f+\phi_{\it{eff}}=90$.

The present invention further provides an optical isolator characterized in that a mark showing the direction of light incidence is formed on the optical isolator of a structure having a maximum optical isolation when a light is incident in an actually used particular oblique direction.

In another embodiment, the optical isolator according to the present invention is fixed obliquely with respect to the direction of light incidence on an outer shape holder having an outer peripheral surface extending in parallel with the direction of light incidence, whereby the optical isolator is fixed in the proper conditions. Usually, the conventional optical isolator has an index showing the direction of polarization of the incident light but there is no marking to show the difference between 0° and 180°. As shown in FIG. 2, the actual optical isolation varies to a large extent depending on the direction of incidence of the light. The optical isolator according to the present invention is composed by adjusting the optical isolator in such manner that the optical isolation becomes optimal for a particular direction of light incidence and attaching a mark.

The present invention also provides an optical isolator or an optical isolator provided with an optical fiber, which has a good optical isolation, by fixedly attaching an optical isolator element to an outer holder or an optical fiber, thereby providing an optical isolator. That is, the optical isolator or the optical isolator provided with an optical fiber is of such a construction that, when a laser light passes through the first and second birefringent plates respectively as an ordinary light and an ordinary light or respectively as extraordinary light and an extraordinary light, the optical isolator is so adjusted in position that the value $|\theta_f + \phi_{\mathit{eff}} - 90°|$ prior to 180° rotation from the adjusted position is less than the value $|\theta_f + \phi_{\mathit{eff}} - 90°|$ after the rotation from the adjusted position.

Further, the optical isolator or the optical isolator provided with an optical fiber may be of such a construction that, when a laser light is incident on the first birefringent plate as an ordinary light or an extraordinary light, the optical isolator is so adjusted in position that the value $|\theta_f + \phi_{\mathit{eff}} - 90°|$ or $|\theta_f - \phi_{\mathit{eff}}|$ prior to rotation of 90°, 180°, or 270° from the adjusted position is less than the value $|\theta_f + \phi_{\mathit{eff}} - 90°|$ or $|\theta_f - \phi_{\mathit{eff}}|$ after the rotation from the adjusted position.

As another aspect of the present invention, the present invention provides an optical isolator including a first and second birefringent plates so arranged that the plane of polarization of a light passing through the first birefringent plate as an ordinary light and the plane of polarization of a light passing through the second birefringent plate as an ordinary light are in non-parallel with each other and a Faraday rotator inserted between the first and second birefringent plates for rotating the plane of polarization of a light incident on the rotator through a fixed angle, characterized in that, when the angles of the optical axes of the first and second birefringent plates are so set that a forward incident polarized light passes through the first and second birefringent plates respectively as ordinary and ordinary lights or extraordinary and extraordinary lights, assuming that, when an actually used incident polarized light is incident in a particular oblique direction, $\phi_{\mathit{eff}}$ (but selected to satisfy 0°<$\phi$eff<90°) is the angle between the plane of polarization of the light passing through the first birefringent plate as an ordinary light and the plane of polarization of the light passing through second birefringent plate as an ordinary light and that $\theta_f$ (but selected to satisfy 0°<$\theta$f<90°) is the angle of the Faraday rotation of said Faraday rotator at its central temperature of use and at its central wavelength of use, if $|\theta f + \phi eff - 90°| < |\theta f - \phi eff|$ is satisfied, the direction of the magnetization of the Faraday rotator is so set that the forward incident polarized light passes through the first and second birefringent plates respectively as ordinary and ordinary lights or respectively as extraordinary and extraordinary lights, and if $|\theta f + \phi eff - 90°| > |\theta f - \phi eff|$ is satisfied the direction of the magnetization of the Faraday rotator is so set that the forward incident polarized light passes through the first and second birefringent plates respectively as ordinary and extraordinary lights or respectively as extraordinary and ordinary lights.

The present invention further provides a method for manufacturing an optical isolator including a first and second birefringent plates so arranged that the plane of polarization of a light passing through the first birefringent plate as an ordinary light and the plane of polarization of a light passing through the second birefringent plate as an ordinary light are in non-parallel with each other and a Faraday rotator inserted between the first and second birefringent plates for rotating the plane of polarization of a light incident on the rotator through a fixed angle, characterized by admitting an actually used polarized light to be incident on the optical isolator, measuring the isolation characteristic in a condition that the direction of the magnetization of the Faraday rotator is so selected to allow the incident polarized light to pass through the first and second plates respectively as ordinary and ordinary lights or respectively as extraordinary and extraordinary lights, measuring the isolation characteristic in a condition that the direction of the magnetization of the Faraday rotator is so selected to allow the incident polarized light to pass through the first and second plates respectively as ordinary and extraordinary lights or as extraordinary and ordinary lights, comparing these two measured values and fixing the direction of the magnetization to one which gives a better isolation characteristic.

The present invention provides an optical isolator integral with an optical fiber, including first and second birefringent plates so arranged that the plane of polarization of a light passing through the first birefringent plate as an ordinary light and the plane of polarization of a light passing through the second birefringent plate as an ordinary light are in non-parallel with each other and a Faraday rotator inserted between the two birefringent plates for rotating the plane of polarization of a light incident on the rotator through a fixed angle, characterized in that, assuming that, when an actually used incident polarized light is incident in a particular oblique direction, $\phi_{\mathit{eff}}$ (but selected to satisfy 0°<$\phi$eff<90°) is the angle between the plane of polarization of the light passing through the first birefringent plate as an ordinary light and the plane of polarization of the light passing through the second birefringent plate as an ordinary light and that $\theta_f$ (but selected to satisfy 0°<$\theta$f<90°) is the angle of the Faraday rotation of said Faraday rotator at its central temperature of use and at its central wavelength of use, if $|\theta f + \phi eff - 90°| < |\theta f - \phi eff|$ is satisfied, the direction of the magnetization of the Faraday rotator is so set that the forward incident polarized light passes through the first and the second birefringent plates respectively as ordinary and ordinary lights or respectively as extraordinary and extraordinary lights, and if $|\theta f + \phi eff - 90°| > |\theta f - \phi eff|$ is satisfied the direction of the magnetization of the Faraday rotator is so set that the forward incident polarized light passes through the first and second birefringent plates respectively as ordinary and extraordinary lights or respectively as extraordinary and ordinary lights.

The present invention further provides a method for manufacturing an optical isolator integral with an optical fiber, including first and second birefringent plates so arranged that the plane of polarization of a light passing through the first birefringent plate as an ordinary light and the plane of polarization of a light passing through the second birefringent plate as an ordinary light are in non-parallel with each other and a Faraday rotator inserted between the first and second birefringent plates for rotating the plane of polarization of a light incident on the rotator through a fixed angle, characterized by allowing an actually used polarized light to be incident on the optical isolator, measuring the isolation characteristic in a condition that the direction of the magnetization of the Faraday rotator is so selected to allow the incident polarized light to pass the first and second plates respectively as ordinary and ordinary lights or respectively as extraordinary and extraordinary lights, measuring the isolation characteristic in a condition that the direction of the magnetization of the Faraday rotator is so selected to allow the incident polarized light to pass the first and second plates respectively as ordinary and extraordinary lights or extraordinary and ordinary lights, comparing these two measured values and fixing the direction of the magnetization to one which gives a better isolation characteristic.

DETAILED DESCRIPTION OF THE INVENTION

The principle of the present optical isolator will be explained in the following cases (A), (B), (C) and (D) which will be utilized for explaining the present invention.

(A) An optical isolator wherein an incident light in the forward direction passes through the first and second birefringent plates as ordinary lights;

(B) An optical isolator wherein an incident light in the forward direction passes through the first and second birefringent plates as extraordinary lights;

(C) An optical isolator wherein an incident light in the forward direction passes through the first birefringent plate as an ordinary light and the second birefringent plate as an extraordinary light;

(D) An optical isolator wherein an incident light in the forward direction passes through the first birefringent plate as an extraordinary light and the second birefringent plate as an ordinary light.

In other words, (A) and (B) are optical isolators wherein the light passes through the first and second birefringent plates both as ordinary lights or as extraordinary lights, and (C) and (D) are optical isolators wherein the light passes through one of the first and second birefringent plates as an ordinary light and through the other as an extraordinary light.

It is noted that an optical isolator having birefringent plates as polarizers utilizes the difference in the travelling path in the birefringent plates depending on whether the light passes through the birefringent plate as an ordinary light or an extraordinary light. Accordingly, by setting the positions of the light source and the optical fiber, it is possible to utilize any one of the ordinary light and the extraordinary light passing through the birefringent plate. Optical isolators (A), (B), (C) and (D) may be constructed by combining the cases where the light passes through a pair of birefringent plates as an ordinary light or an extraordinary light. This is the feature remarkably different from other polarizers such as polarization glass, polarization beam splitter. For example, polarization glass has a function of absorbing one of a linearly polarized light and in polarization beam splitter the direction of one of the exiting lights is not parallel with the incident light.

Case (A)

Figure 3A:
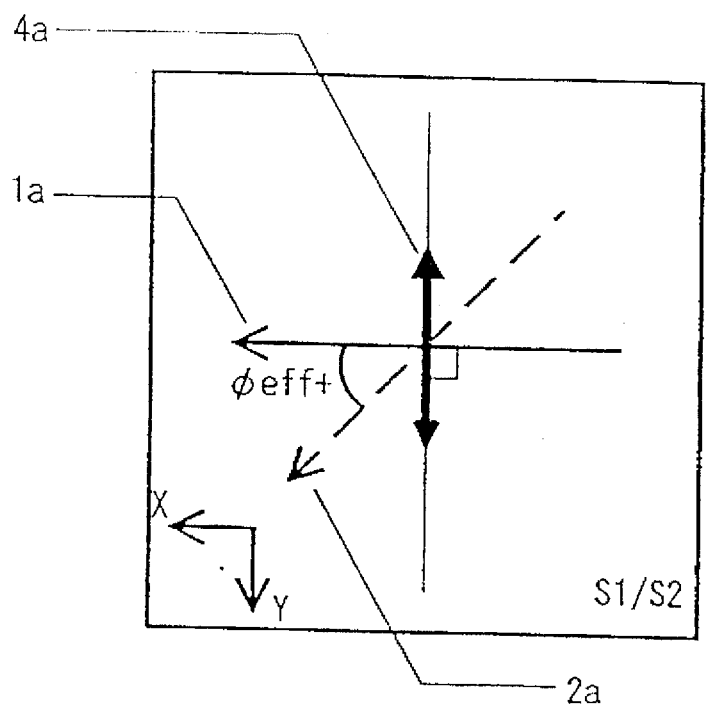
FIGS. 3(a) and 3(b) are a view showing the C-axes (optical axes) of two birefringent plates and the Faraday rotation angle of a Faraday rotator.
Figure 3B:
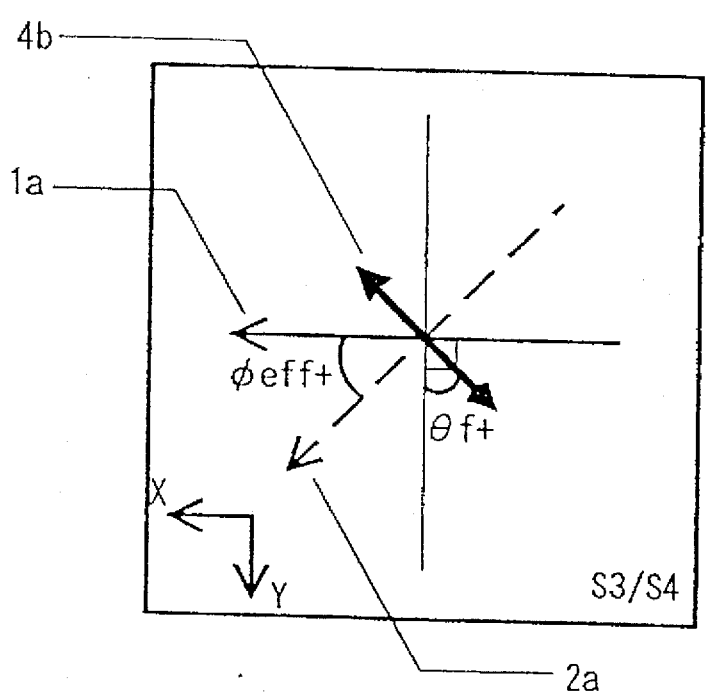
Figure 4A:
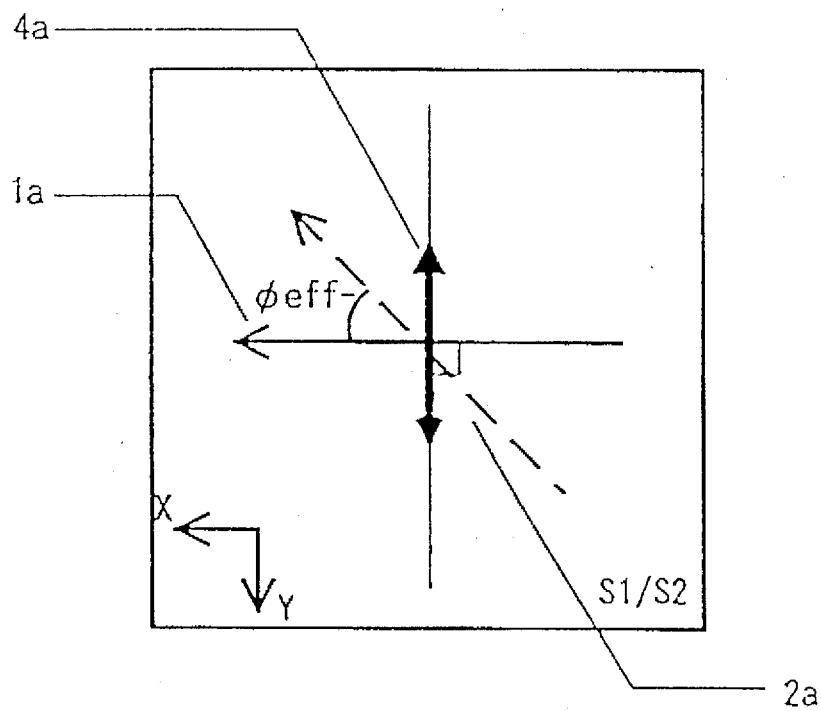
FIGS. 4(a) and 4(b) are a view showing the C-axes (optical axes) of two birefringent plates and the Faraday rotation angle of a Faraday rotator.
Figure 4B:
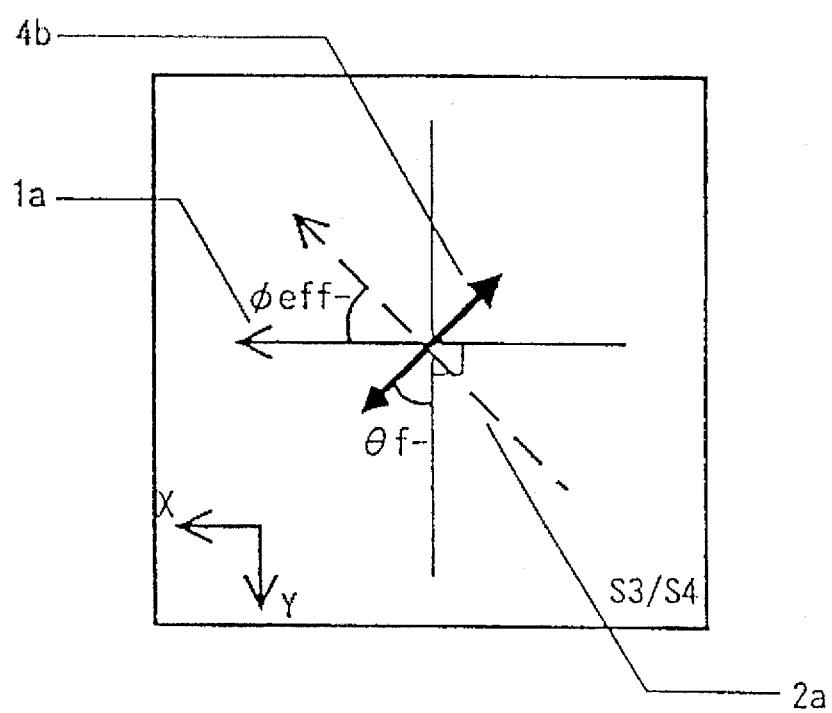

The principle of the present invention will now be explained in making reference to FIGS. 3–7. Referring to FIGS. 3 and 4, 1a indicates the C-axis (optical axis) of the first birefringent plate, 2a indicates the C-axis (optical axis) of the second birefringent plate, and 4a and 4b indicate the directions of polarization of linearly polarized lights passing through the birefringent plates (4a is the direction of the linearly polarized light in the first birefringent plate and 4b is the direction of the linearly polarized light in the second birefringent plate) as looked from the incident side.

It will be noted in the following explanation that the sign "+" suffixed to θf indicates that the direction of rotation is counterclockwise as seen from the incident side in the forward direction (in the direction of the minimum rotation as seen in the forward direction) and the sign "−" indicates the direction of rotation is clockwise. Further, the sign "+" suffixed to φeff indicates that the direction of rotation is counterclockwise with respect to the C-axis (optical axis) of the first birefringent plate(in the direction of the minimum rotation as seen in the forward direction) and the sign "−" suffixed to φeff indicates that the direction of rotation is clockwise with respect to the C-axis (optical axis) of the first birefringent plate (in the direction of the minimum rotation as seen in the forward direction).

In FIG. 3, the direction (θ1, φ1) of the C-axis (optical axis) of the first birefringent plate is set at (45°, 0°) and the direction (θ2, φ2) of the C-axis of the second birefringent plate is set at (45°, 45°+α) where the angle α is an angle of adjustment to compensate for the oblique incident light, which is so set that the optical relative angle φeff+ between the first and second birefringent plates is 45° (counterclockwise) for the oblique incident light. Also, the Faraday rotation angle θf+ of the Faraday rotator is so set that the plane of polarization of the incident light (lying in the direction of the linear polarization) is rotated by 45° (counterclockwise).

Accordingly, the light passes through the first birefringent plate as an ordinary light, the plane of polarization (lying in the direction of the linear polarization) is rotated by θf+ by the Faraday rotator and then the light passes through the second birefringent plate again as an ordinary light.

On the other hand, in the case of FIG. 4, the direction (θ1, φ1) of the C-axis (optical axis) of the first birefringent plate is set at (45°, 0°) and the direction (θ2, φ2) of the C-axis (optical axis) of the second birefringent plate is set at (45°, 315°+α) and the optical relative angle φeff− of the two birefringent plates is set at 45° (clockwise). Also, the angle θf− is so set that the plane of polarization of the incident light (lying in the direction of the linear polarization) is rotated by 45° (clockwise).

Accordingly, in this case, too, similarly to FIG. 3, the light passes through the first birefringent plate as an ordinary light, the plane of polarization (lying in the direction of the linear polarization) is rotated by θf− by the Faraday rotator and then the light passes through the second birefringent plate again as an ordinary light.

Incidentally, the birefringent plates are generally made of rutile crystal and the Faraday rotator is generally made of Bi-substituted rare earth iron garnet.

Next, the transmission paths in the forward or backward direction of the optical isolator as set in FIG. 4, will be explained in reference to FIGS. 5–7. In these figures, it is assumed that the magnetic field is applied to the Faraday rotator in the +Z direction of the optical isolator (in the direction of the backward travelling).

Figure 5:
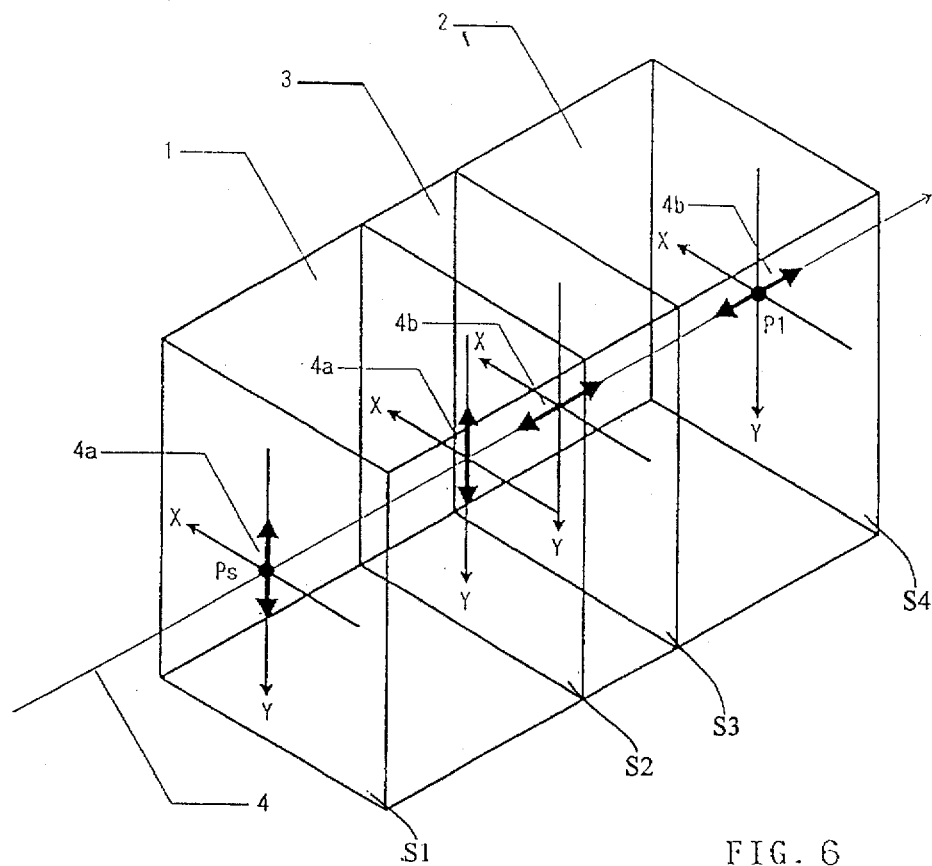
FIG. 5 is a view showing the transmission path of a forward light in an optical isolator according to the present invention.

FIG. 5 shows the transmission path in the forward direction. The light incident on the point Ps of the surface S1 of the first birefringent plate 1 passes generally straight through the first birefringent plate as an ordinary light in the forward direction to the surface S2, the plane of polarization is then rotated by the Faraday rotator 3, thereafter the light passes generally straight through the second birefringent plate as an ordinary light between the surfaces S3 and S4, and the light exits from the point P1 of the surface S4. Accordingly, the semiconductor laser, lens, optical fiber and other elements are arranged in such positions that the forward light passes from Ps on the surface S1 to the point P1 on the surface S2.

Figure 6:
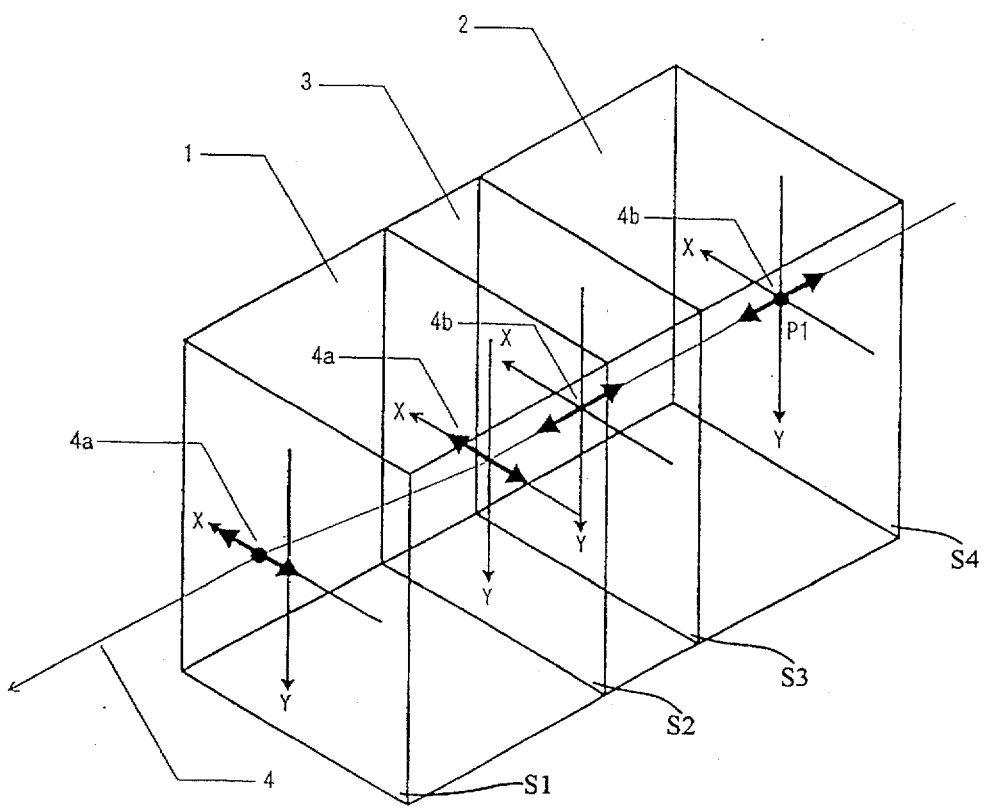
FIG. 6 is a view showing the transmission path of a backward light in an optical isolator according to the present invention.

FIG. 6 shows the backward transmission path (The light is incident on the second birefringent plate 2 as an ordinary light). The light incident on the point P1 of the surface S4 of the second birefringent plate 2 passes generally straight to S3 as an ordinary light in the backward direction to the surface S3, the plane of polarization is then rotated by the Faraday rotator 3, thereafter the light passes from the surfaces S2 to S1 as an extraordinary light but does not travel straight, and the light exits from a point other than the point Ps on the surface S1.

Figure 7:
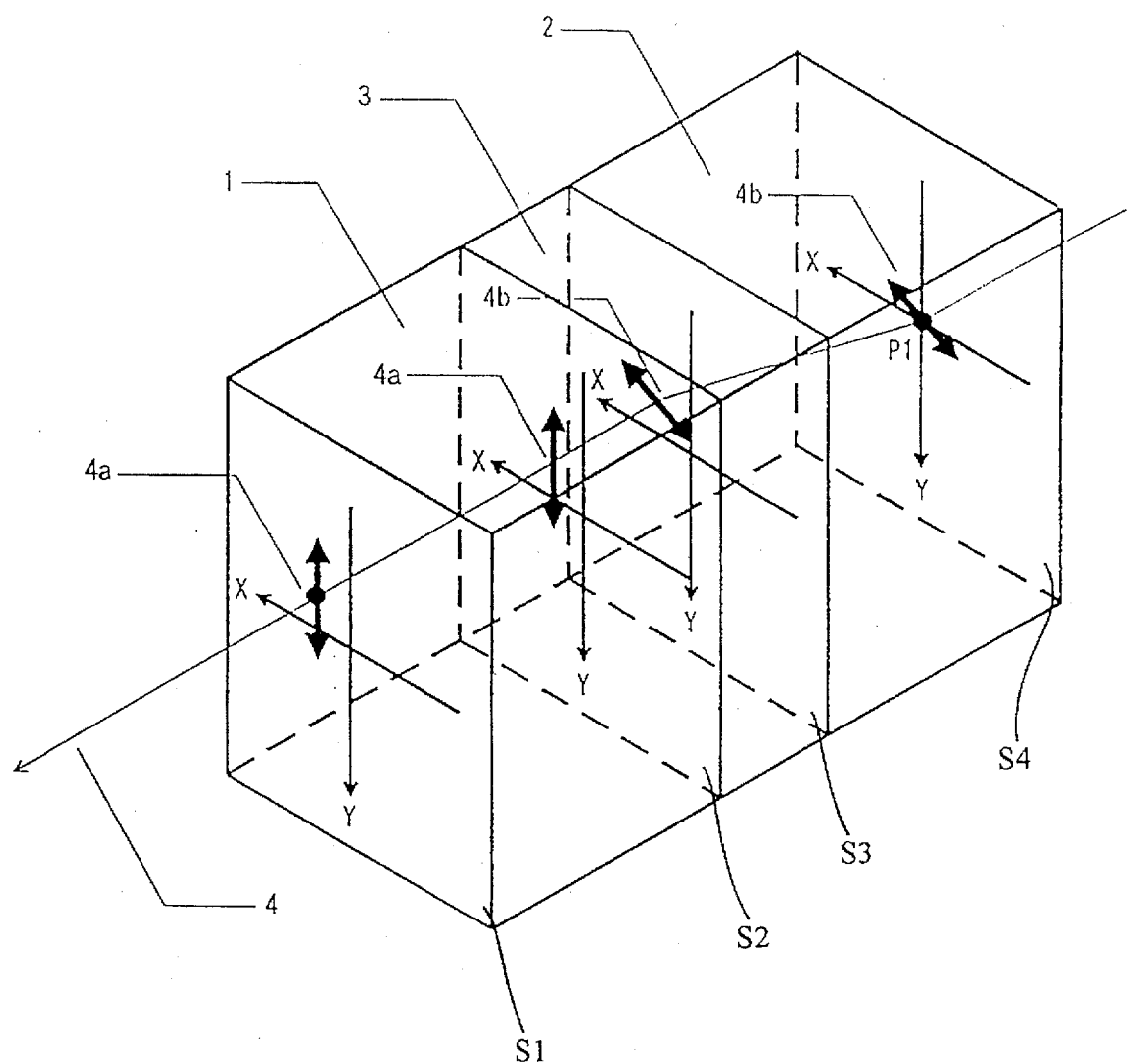
FIG. 7 is a view showing the transmission path of a backward light in an optical isolator according to the present invention.

FIG. 7 shows the backward transmission path (The light is incident on the second birefringent plate 2 as an extraordinary light). The light incident on the point P1 of the surface S4 of the second birefringent plate 2 passes as an extraordinary light in the backward direction to the surface S3 and hence does not travel straight, the plane of polarization is then rotated by the Faraday rotator 3, thereafter the light passes generally straight from the surfaces S2 to S1 as an ordinary light, and the light exits from a point other than the point Ps on the surface S1.

As described in reference to FIGS. 5–7, with respect to the forward transmission light, only the light passing through the point Ps on the surface S1 and the point P1 on the surface S4 can enter the optical fiber. On the other hand, with respect to the backward (return) light, the light cannot return to the light source unless the backward light entering the point P1 passes through the point Ps on the surface S1.

Here, with respect to the optical isolator wherein the incident light in the forward direction passes through the first and second birefringent plates as ordinary lights respectively, the forward transmissivity Tf and the backward transmissivity can be expressed by the following equations.

$$Tf = \cos^2(\theta f - \phi\text{eff}) \quad (7)$$

$$Tb = \cos^2(\theta f + \phi\text{eff}) \quad (8)$$

In the equation (7), if θf−φeff=0° (Tf=1) is satisfied, entire light is transmitted to the optical fiber. On the other hand, in the equation (8), if the θf+φeff=90° (Tb=0) is satisfied, the backward (return) light cannot return to the optical source.

Accordingly, in order to improve the characteristic of the optical isolator, it is the most important to decrease the backward transmissivity Tb to satisfy the equation θf+φeff=90°.

Case (B)

In the case (A) an optical isolator was explained wherein the forward incident light passes through the first and second birefringent plates as ordinary lights respectively. On the other hand, the case(B) relates to an optical isolator wherein the forward incident light passes through the first and second birefringent plates as extraordinary lights respectively, which will now be explained in reference to FIGS. 8 and 9.

Figure 8A:
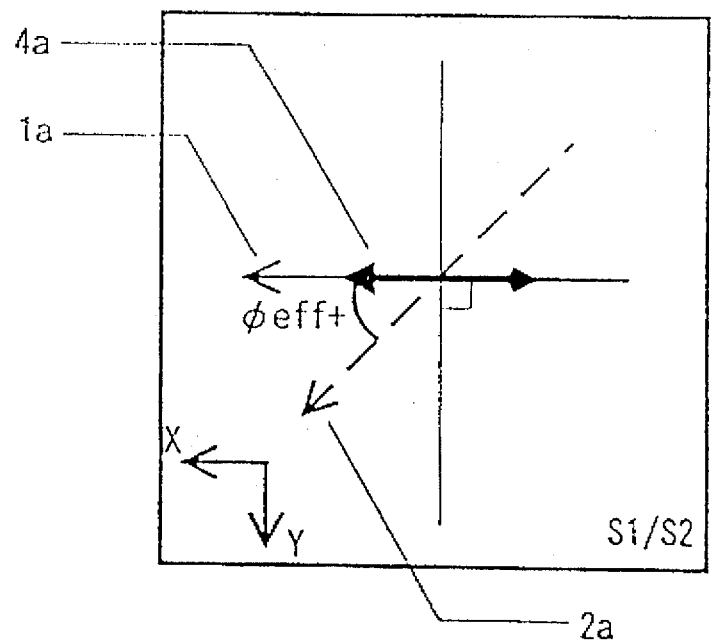
FIGS. 8(a) and 8(b) are a view showing the C-axes (optical axes) of two birefringent plates and the Faraday rotation angle of a Faraday rotator.
Figure 8B:
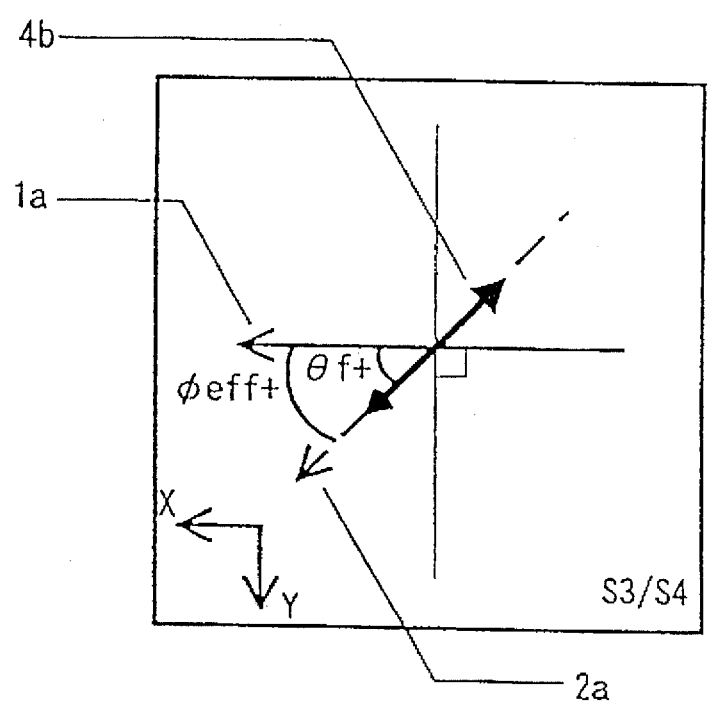

In FIG. 8, the direction ($\theta 1$, $\phi 1$) of the C-axis (optical axis) of the first birefringent plate is set at (45°, 0°) and the direction ($\theta 2$, $\phi 2$) of the C-axis of the second birefringent plate is set at (45°, 45°+$\alpha$), the optical relative angle $\phi$eff+ between the two birefringent plates is set at 45° (counterclockwise) for the oblique incident light. Also, the Faraday rotation angle $\theta$ f+ of the Faraday rotator is so set that the plane of polarization of the incident light (lying in the direction of the linear polarization) is rotated by 45° (counterclockwise).

Accordingly, the light passes through the first birefringent plate as an extraordinary light, the plane of polarization (lying in the direction of the linear polarization) is rotated by $\theta$f+ by the Faraday rotator and then the light passes through the second birefringent plate again as an extraordinary light.

Figure 9A:
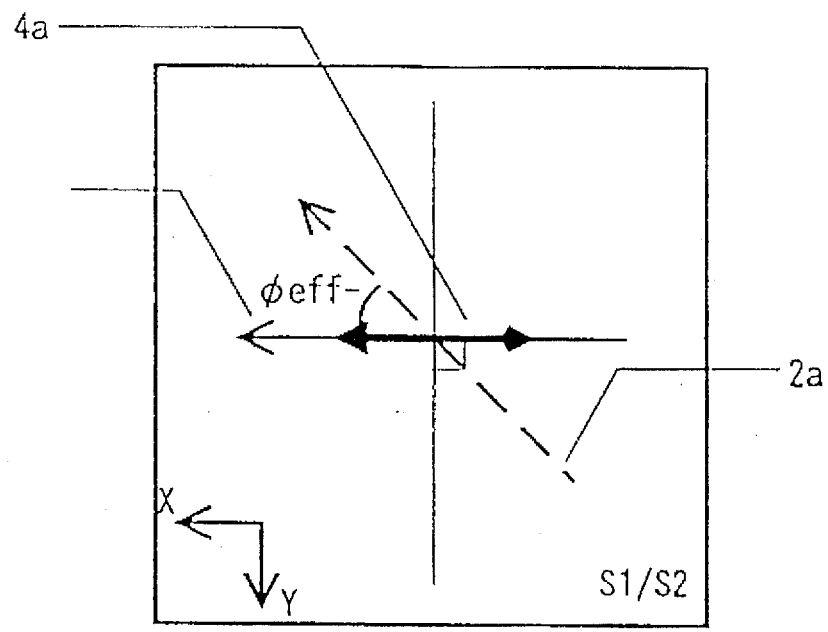
FIGS. 9(a) and 9(b) are a view showing the C-axes (optical axes) of two birefringent plates and the Faraday rotation angle of a Faraday rotator.
Figure 9B:
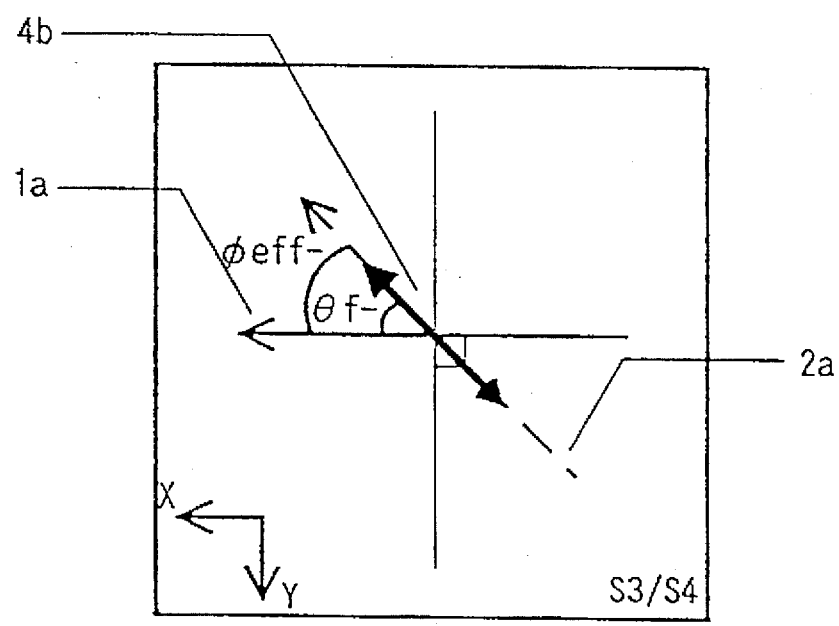

On the other hand, in the case of FIG. 9, the direction ($\theta 1$, $\phi 1$) of the C-axis (optical axis) of the first birefringent plate is set at (45°, 0°) and the direction ($\theta 2$, $\phi 2$) of the C-axis (optical axis) of the second birefringent plate is set at (45°, 315°+$\alpha$) and the optical relative angle $\phi$eff− of the two birefringent plates is set at 45° (clockwise). Also, the angle $\theta$f− is so set that the plane of polarization of the incident light (lying in the direction of the linear polarization) is rotated by 45° (clockwise).

Accordingly, in this case, too, similarly to FIG. 8, the light passes through the first birefringent plate as an extraordinary light, the plane of polarization (lying in the direction of the linear polarization)is rotated by $\theta$f− by the Faraday rotator and then the light passes through the second birefringent plate again as an extraordinary light.

Incidentally, the birefringent plates are generally made of rutile crystal and the Faraday rotator is generally made of Bi-substituted rare earth iron garnet.

With the optical isolator set as just described and the semiconductor laser, lens, optical fiber and other elements being arranged in the forward path (The path along which the light passes through the first and second birefringent plates respectively as extraordinary lights), the backward transmissivity can be reduced by satisfying the equation $\theta$f+$\phi$eff=90°.

Case (C)

The case (C) will now be explained in making reference to FIGS. 10–14.

Figure 10A:
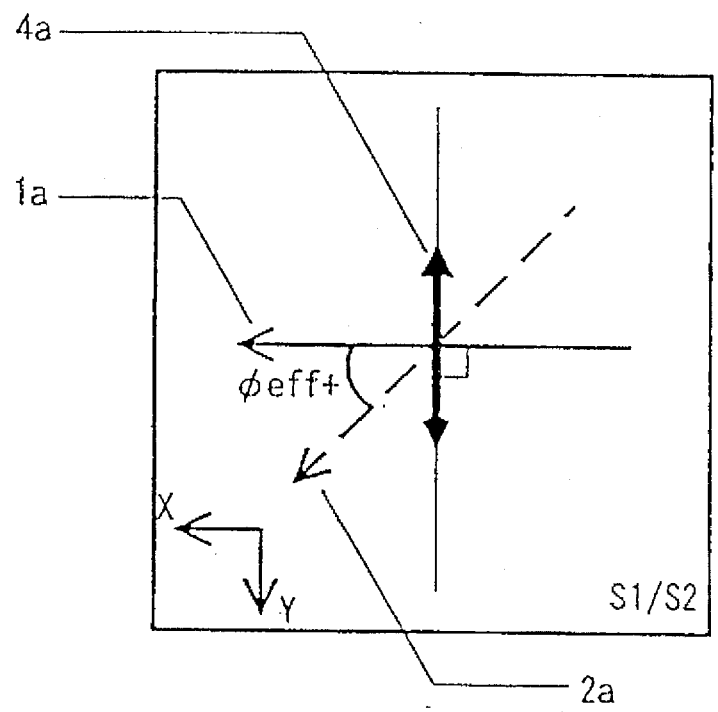
FIGS. 10(a) and 10(b) are a view showing the C-axes (optical axes) of two birefringent plates and the Faraday rotation angle of a Faraday rotator.
Figure 10B:
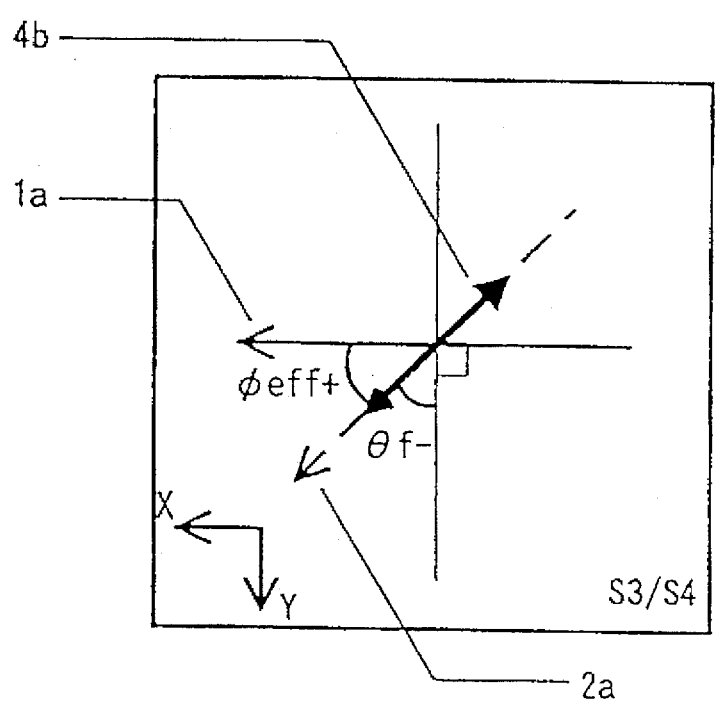

In FIG. 10, the direction ($\theta 1$, $\phi 1$) of the C-axis (optical axis) of the first birefringent plate is set at (45°, 0°) and the direction ($\theta 2$, $\phi 2$) of the C-axis of the second birefringent plate is set at (45°, 45°+$\alpha$), the optical relative angle $\phi$eff+ between the two birefringent plates is set at 45° (counterclockwise) for the oblique incident light. Also, the Faraday rotation angle $\theta$f− of the Faraday rotator is so set that the plane of polarization of the incident light (lying in the direction of the linear polarization) is rotated by 45° (clockwise).

Accordingly, the light passes through the first birefringent plate as an ordinary light, the plane of polarization (lying in the direction of the linear polarization) is rotated by $\theta$f− by the Faraday rotator and then the light passes through the second birefringent plate again as an extraordinary light.

Figure 11A:
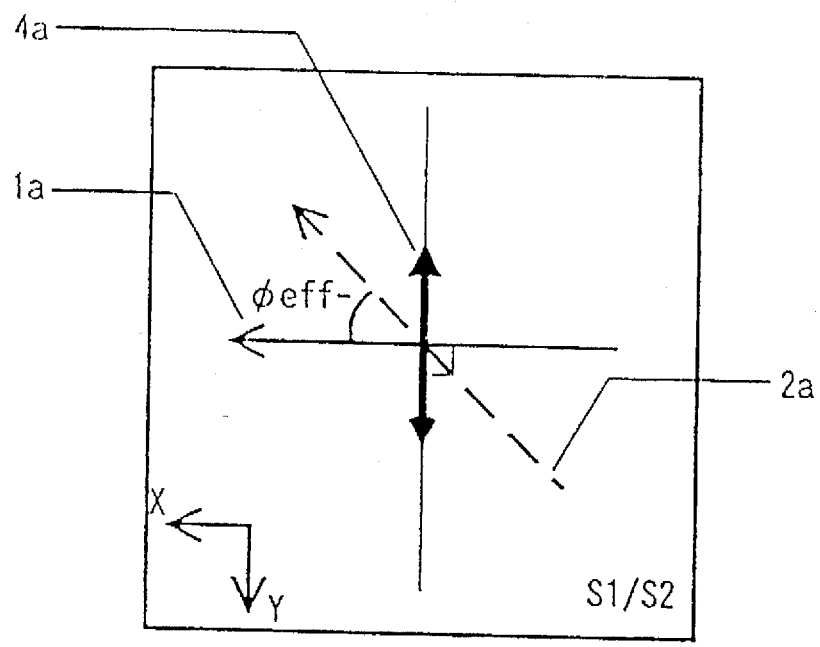
FIGS. 11(a) and 11(b) are a view showing the C-axes (optical axes) of two birefringent plates and the Faraday rotation angle of a Faraday rotator.
Figure 11B:
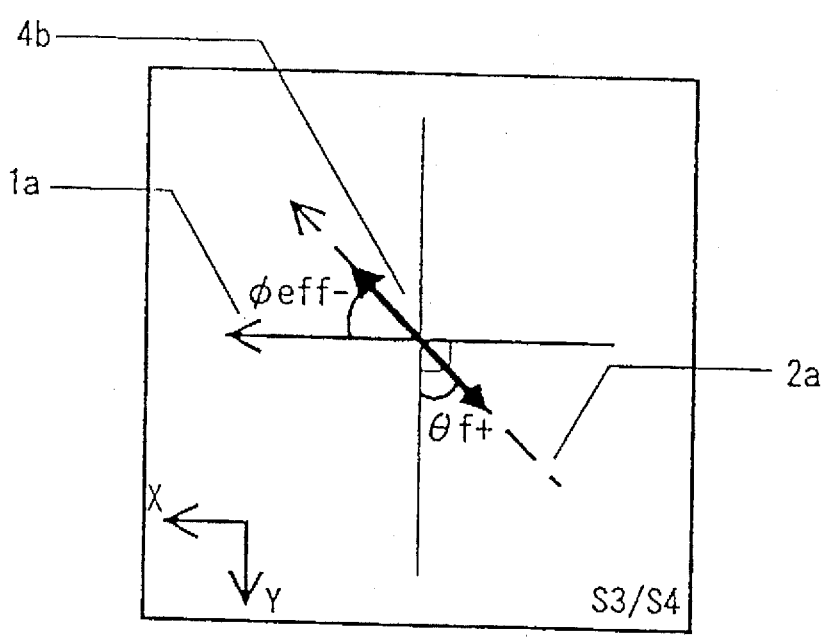

On the other hand, in the case of FIG. 11, the direction ($\theta 1$, $\phi 1$) of the C-axis (optical axis) of the first birefringent plate is set at (45°, 0°) and the direction ($\theta 2$, $\phi 2$) of the C-axis (optical axis) of the second birefringent plate is set at (45°, 315°+$\alpha$) and the optical relative angle $\phi$eff− of the two birefringent plates is set at 45° (clockwise). Also, the Faraday rotation angle $\theta$f+ is so set that the plane of polarization of the incident light (lying in the direction of the linear polarization) is rotated by 45° (counterclockwise).

Accordingly, in this case, too, similarly to FIG. 10, the light passes through the first birefringent plate as an ordinary light, the plane of polarization (lying in the direction of the linear polarization)is rotated by $\theta$f+ by the Faraday rotator and then the light passes through the second birefringent plate as an ordinary light.

Incidentally, the birefringent plates are generally made of rutile crystal and the Faraday rotator is generally made of Bi-substituted rare earth iron garnet.

The light paths of the optical isolator set as in FIG. 11 will now be explained in reference to FIGS. 12–14, in which the direction of the magnetic field applied to the Faraday rotator is set in the −Z direction (the direction of the forward light travelling).

Figure 12:
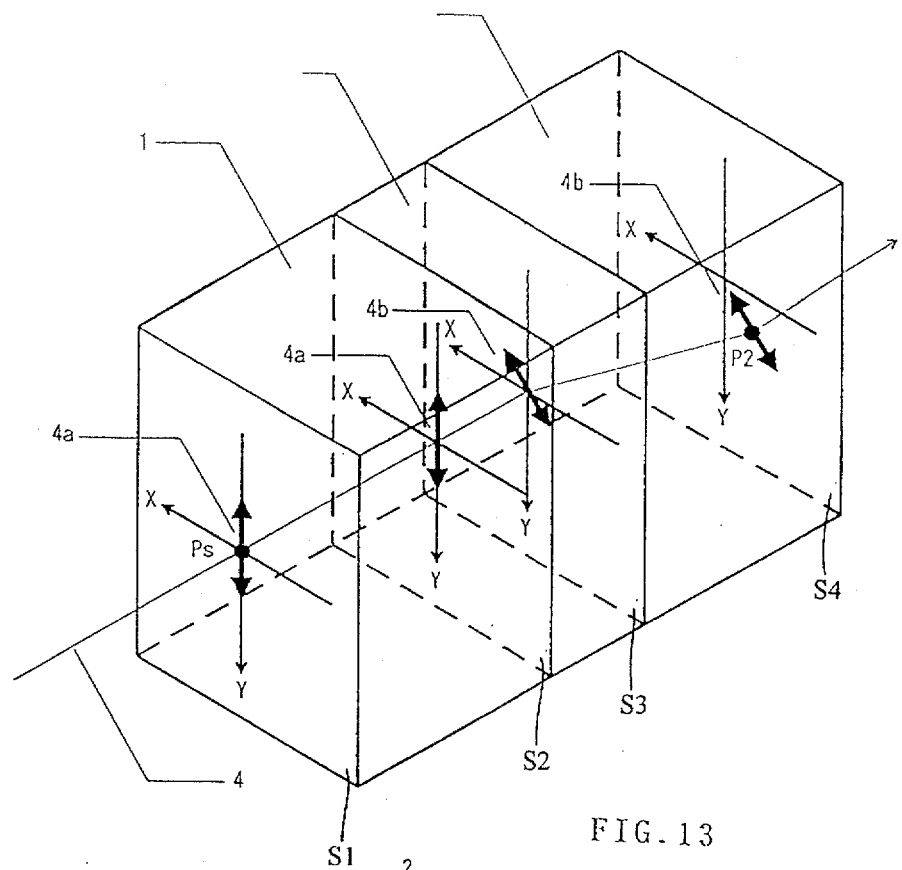
FIG. 12 is a view showing the transmission path of a forward light in an optical isolator according to the present invention.

FIG. 12 shows the transmission path in the forward direction. The light incident on the point Ps on the surface S1 of the first birefringent plate 1 passes generally straight through the first birefringent plate as an ordinary light in the forward direction to the surface S2, the plane of polarization is then rotated by the Faraday rotator 3, thereafter the light passes through the second birefringent plate as an extraordinary light from the surfaces S3 to S4 and hence does not travel straight, and the light exits from the point P2 of the surface S4. Accordingly, the semiconductor laser, lens, optical fiber and other elements are arranged in such positions that the forward light passes from Ps on the surface S1 to the point P2 on the surface 52.

Figure 13:
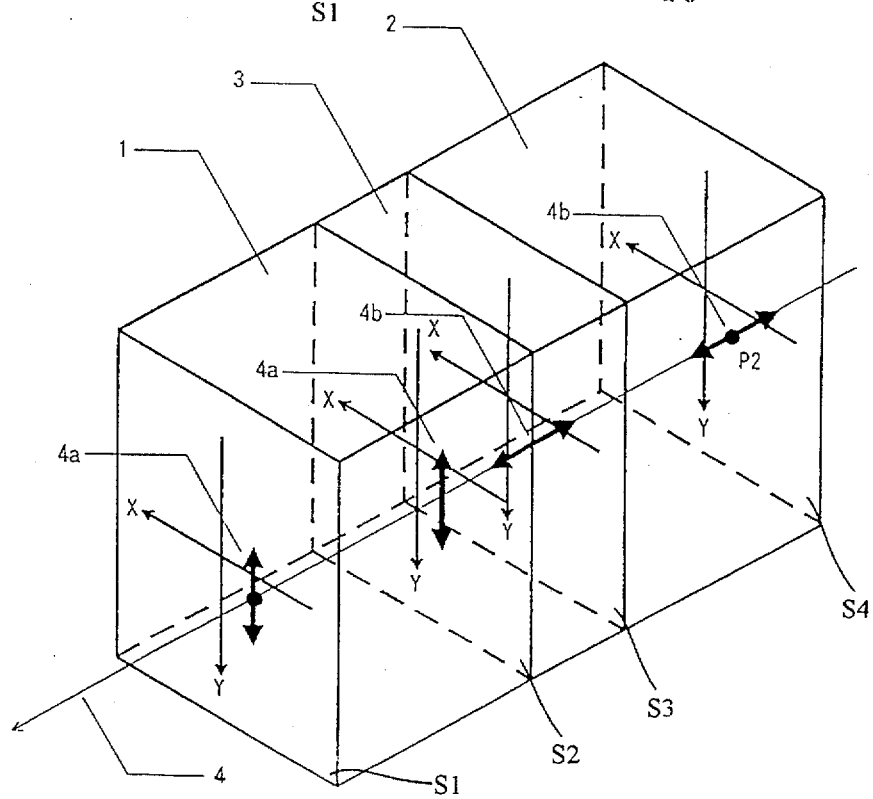
FIG. 13 is a view showing the transmission path of a backward light in an optical isolator according to the present invention.

FIG. 13 shows the backward transmission path (The light is incident on the second birefringent plate 2 as an ordinary light). The light incident on the point P2 of the surface S4 of the second birefringent plate 2 passes generally straight to S3 as an ordinary light in the backward direction to the surface S3, the plane of polarization is then rotated by the Faraday rotator 3, thereafter the light passes generally straight from the surfaces S2 to S1 as an ordinary light, and the light exits from a point other than the point Ps on the surface S1.

Figure 14:
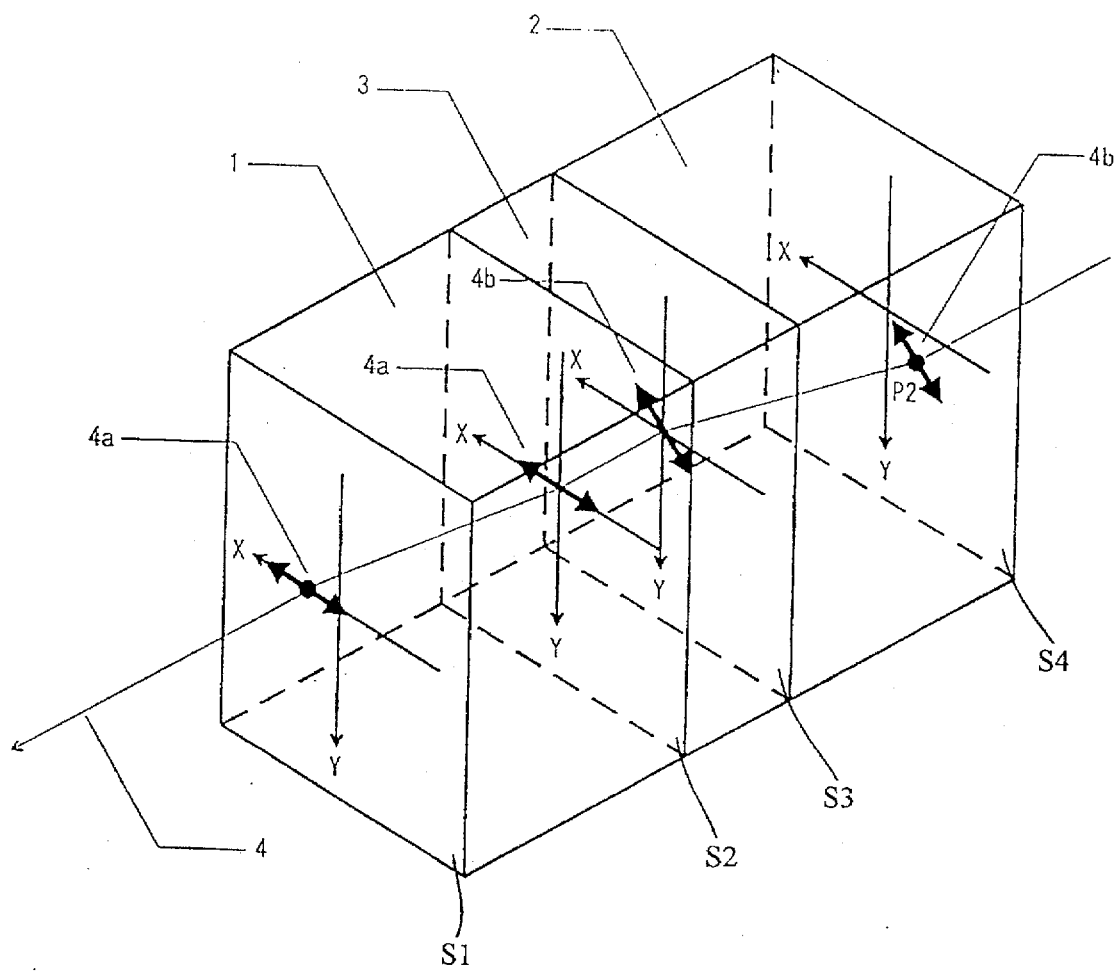
FIG. 14 is a view showing the transmission path of a backward light in an optical isolator according to the present invention.

FIG. 14 shows the backward transmission path (The light is incident on the second birefringent plate 2 as an extraordinary light). The light incident on the point P2 of the surface S4 of the second birefringent plate 2 passes to S3 as an extraordinary light in the backward direction to the surface S3 and hence does not travel straight, the plane of polarization is then rotated by the Faraday rotator 3, thereafter the light passes from the surfaces S2 to S1 as an extraordinary light and hence does not travel straight, and the light exits from a point other than the point Ps on the surface S1.

As is explained in reference to FIGS. 12–14, with respect to the forward transmission light, only the laser light which has passed the point Ps of the surface S1 and the point P2 of the surface S4 can enter the optical fiber. As for the backward transmission light (return light) the light which is incident on the point P2 of the surface S2 cannot return to the light source unless it passes the point Ps of the surface S1.

Here, with respect to the optical isolator wherein the incident light in the forward direction passes through the first birefringent plate as an ordinary and the second birefringent plate as an extraordinary light, the forward transmissivity Tf and the backward transmissivity can be expressed by the following equations.

$$Tf = \sin^2(\theta f + \phi eff) \quad (9)$$

$$Tb = \sin^2(\theta f - \phi eff) \quad (10)$$

In the equation (9), if θf+φeff=90° (Tf=1) is satisfied, entire light is transmitted to the optical fiber. On the other hand, in the equation (10), if the θf−φeff=0° (Tb=0) is satisfied, the backward (return) light cannot return to the optical source.

Accordingly, in order to improve the characteristic of the optical isolator, it is the most important to decrease the backward transmissivity Tb to satisfy the equation θf−φeff= 0°.

The case (D)

In the case (C) an optical isolator was explained wherein the forward incident light passes through the first birefringent plate as ordinary light and the second birefringent plate as extraordinary light. On the other hand, the case (D) relates to an optical isolator wherein the forward incident light passes through the first birefringent plate as an extraordinary light and the second birefringent plate as an ordinary light, which will now be explained in reference to FIGS. 15 and 16.

Figure 15A:
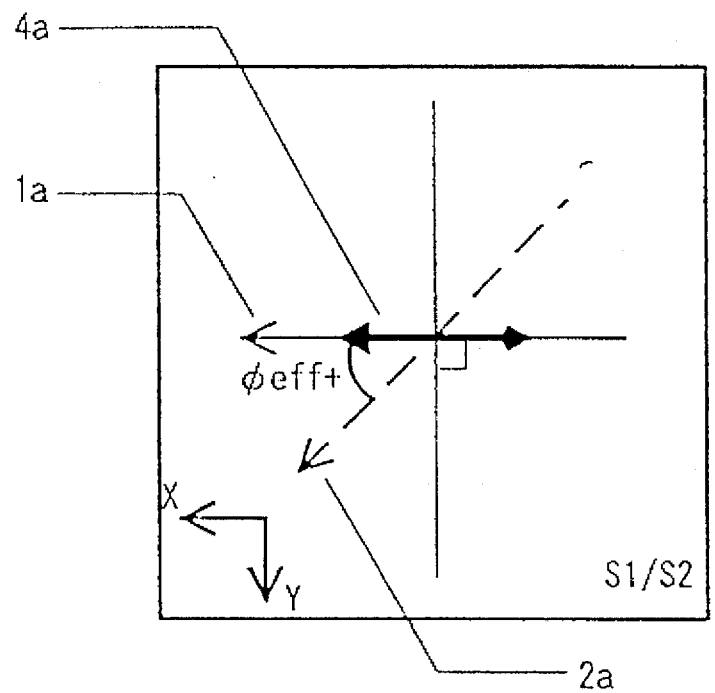
FIGS. 15(a) and 15(b) are a view showing the C-axes (optical axes) of two birefringent plates and the Faraday rotation angle of a Faraday rotator.
Figure 15B:
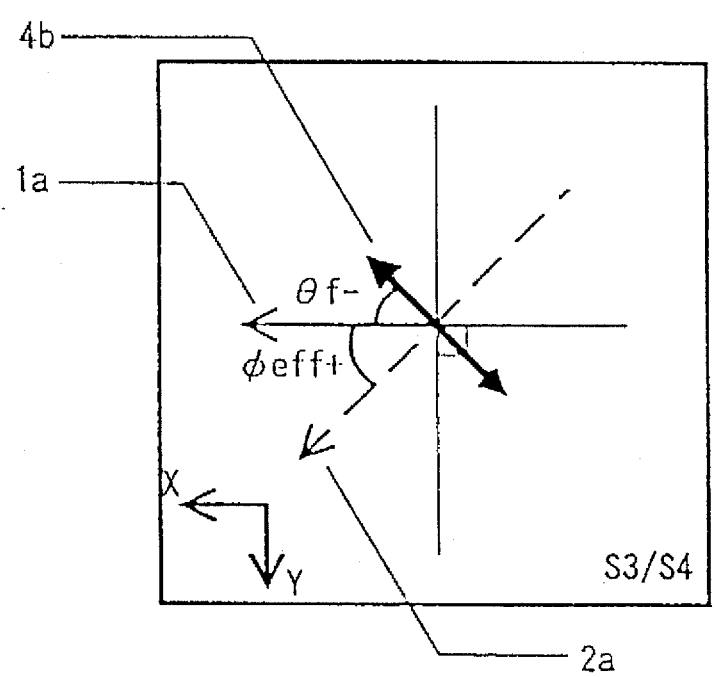

In FIG. 15, the direction (θ1, φ1) of the C-axis (optical axis) of the first birefringent plate is set at (45°, 0°), the direction (θ2, φ2) of the C-axis of the second birefringent plate is set at (45°, 45°+α), the optical relative angle φeff+ between the two birefringent plates is set at 45° (counterclockwise) for the oblique incident light. Also, the Faraday rotation angle θf− of the Faraday rotator is so set that the plane of polarization of the incident light (lying in the direction of the linear polarization) is rotated by 45° (clockwise).

Accordingly, the light passes through the first birefringent plate as an extraordinary light, is rotated by θf− by the Faraday rotator with respect to the plane of polarization (lying in the direction of the linear polarization) and then passes through the second birefringent plate again as an ordinary light.

Figure 16A:
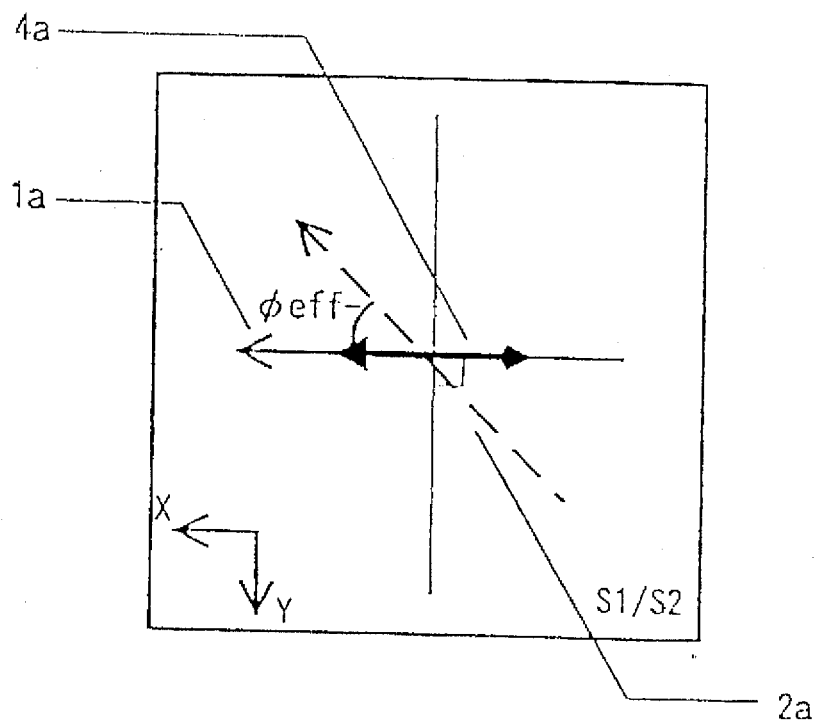
FIGS. 16(a) and 16(b) are a view showing the C-axes (optical axes) of two birefringent plates and the Faraday rotation angle of a Faraday rotator.
Figure 16B:
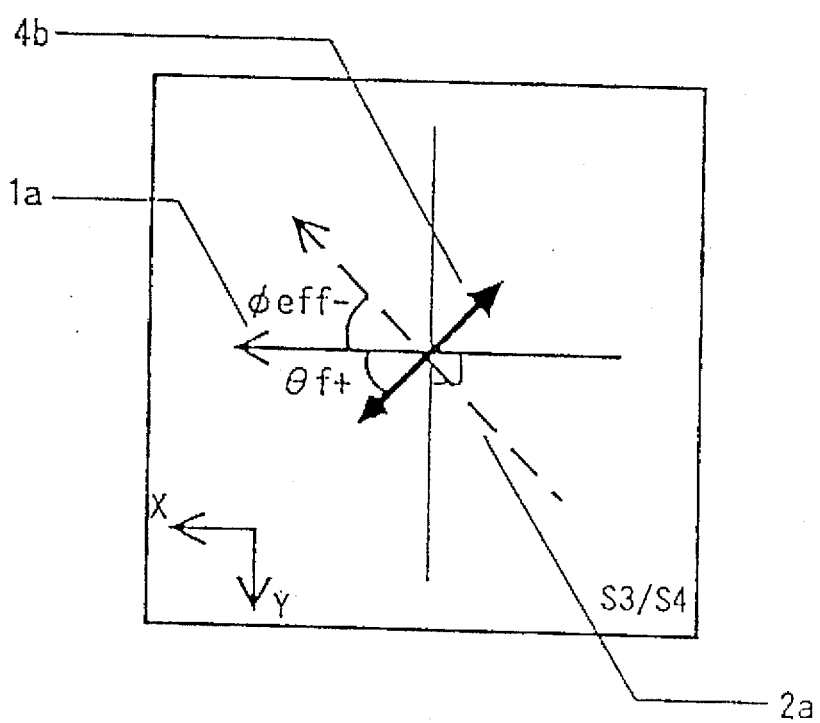

On the other hand, in the case of FIG. 16, the direction (θ1, φ1) of the C-axis (optical axis) of the first birefringent plate is set at (45°, 0°) and the direction (θ2, φ2) of the C-axis (optical axis) of the second birefringent plate is set at (45°, 315°+α) and the optical relative angle φeff− of the two birefringent plates is set at 45° (clockwise). Also, the angle θf+ is so set that the plane of polarization of the incident light (lying in the direction of the linear polarization) is rotated by 45° (counterclockwise).

Accordingly, in this case, too, similarly to FIG. 15, the light passes through the first birefringent plate as an extraordinary light, is rotated by θf+ by the Faraday rotator with respect to the plane of polarization (lying in the direction of the linear polarization) and then passes through the second birefringent plate again as an ordinary light.

Incidentally, the birefringent plates are generally made of rutile crystal and the Faraday rotator is generally made of Bi-substituted rare earth iron garnet.

With the optical isolator set as just described and the semiconductor laser, lens, optical fiber and other elements being arranged in the forward path (The path along which the light passes through the first birefringent plate as an extraordinary light and the second birefringent plate as an ordinary light), the backward transmissivity can be reduced by satisfying the equation θf−φeff=0°.

In one aspect of the present invention, the following means of solution is provided.

As described hereinbefore, with respect to the following optical isolators:

(A) An optical isolator wherein an incident light in the forward direction passes through the first and second birefringent plates as ordinary lights, or (B) An optical isolator wherein an incident light in the forward direction passes through the first and second birefringent plates as extraordinary lights, the isolation characteristic and production yield can be improved for an actual oblique incident light by reducing the backward transmissivity Tb given by the equation (3) or making the value |θf+φeff−90°| small.

On the other hand, with respect to the optical isolators:

(C) An optical isolator wherein an incident light in the forward direction passes through the first birefringent plate as an ordinary light and the second birefringent plate as an extraordinary light, (D) An optical isolator wherein an incident light in the forward direction passes through the first birefringent plate as an extraordinary light and the second birefringent plate as an ordinary light, the isolation characteristic and production yield can be improved for an actual oblique incident light by reducing the backward transmissivity Tb given by the equation (6) or making the value |θf−φeff| small.

Further, the value φeff varies depending on the direction of incidence of the laser light and accordingly unless the incident direction of the laser is properly fixed, a sufficient isolation characteristic cannot be attained. Therefore, a mark for indicating the direction of incidence of laser light which assures a good isolation characteristic is affixed on the incident surface or the outer shape holder of the optical isolator produced according to the present invention by means of vapor deposition or printing. Accordingly, by positioning the optical isolator element or the optical isolator (with an outer shape holder) based on the mark, an improved isolation characteristic can be reliably obtained. Embodiment for this mode will be explained in Example 1.

The present invention also provides an optical isolator provided with an optical fiber by assembling an optical fiber having an obliquely cut end surface integrally with an optical isolator and fixing the optical isolator at an angle which makes the optical isolation characteristic optimal.

Figure 19:
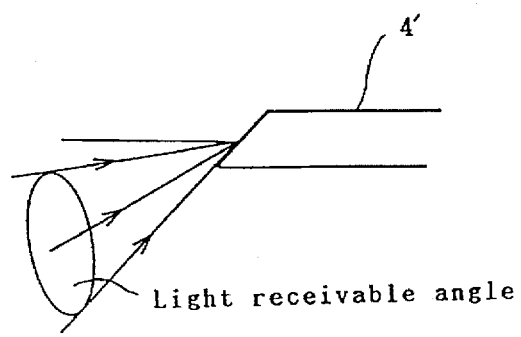
FIG. 19 is a view showing an oblique incident surface of an optical fiber and the possible range of angle capable of receiving a light.

The direction capable of receiving an incident light by an optical fiber having an oblique cut end surface is within a narrow range as shown in FIG. 19. Accordingly, if the optical isolator and the optical fiber are integrally fixed together, the direction of the light incidence onto the optical isolator is almost fixed. If the characteristic of the optical isolator is optimized in this direction, the direction of the light incidence is generally the same when a laser diode, the optical isolator integral with the optical fiber, and lens are connected together and accordingly the orientations of the lens system and the laser diode are necessarily determined and thus the optimum condition of use is materialized.

Figure 1:
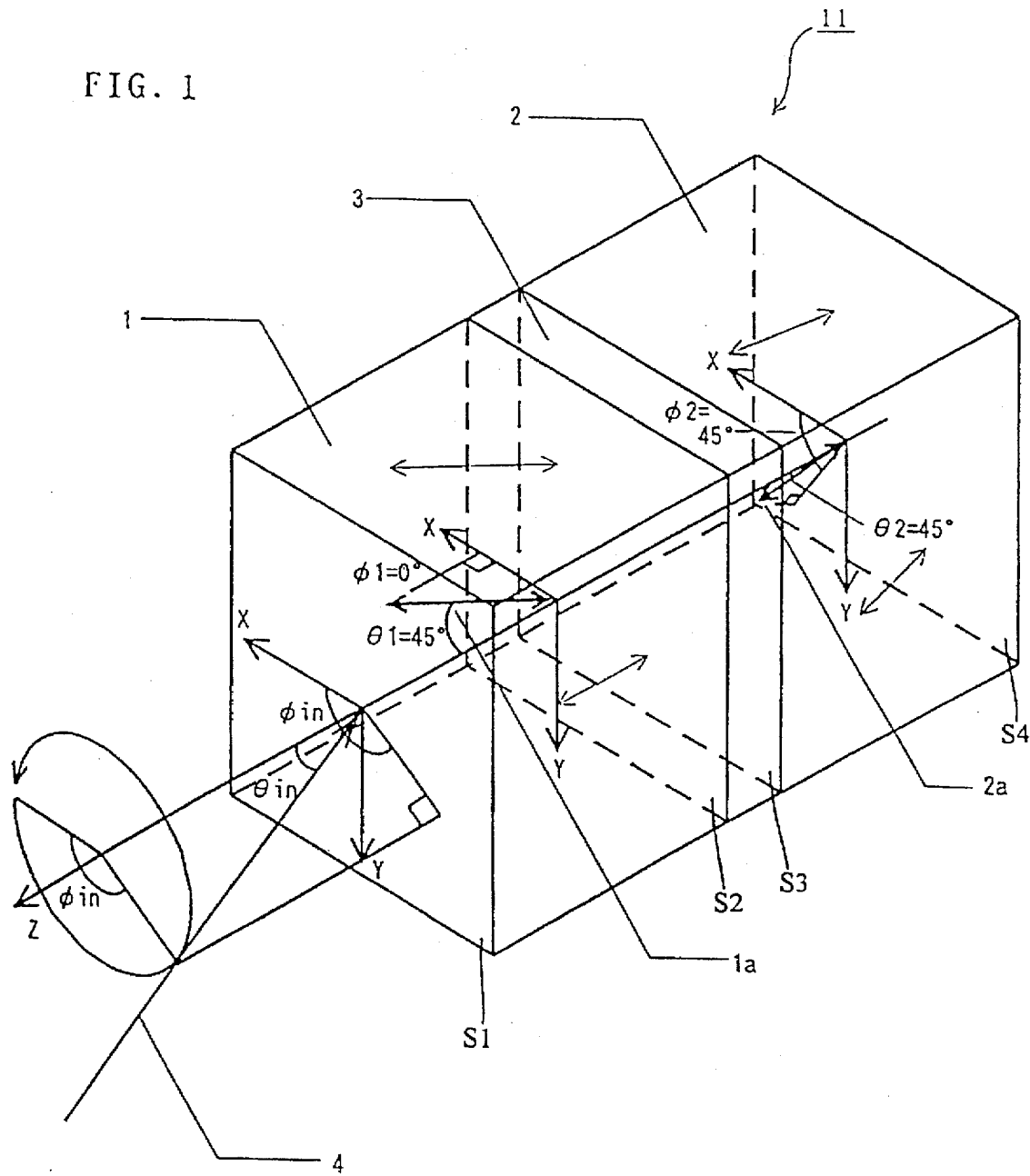
FIG. 1 is a perspective view of an optical isolator element illustrating the construction, the direction of incident light and the orientations of optical polarizers.
Figure 2:
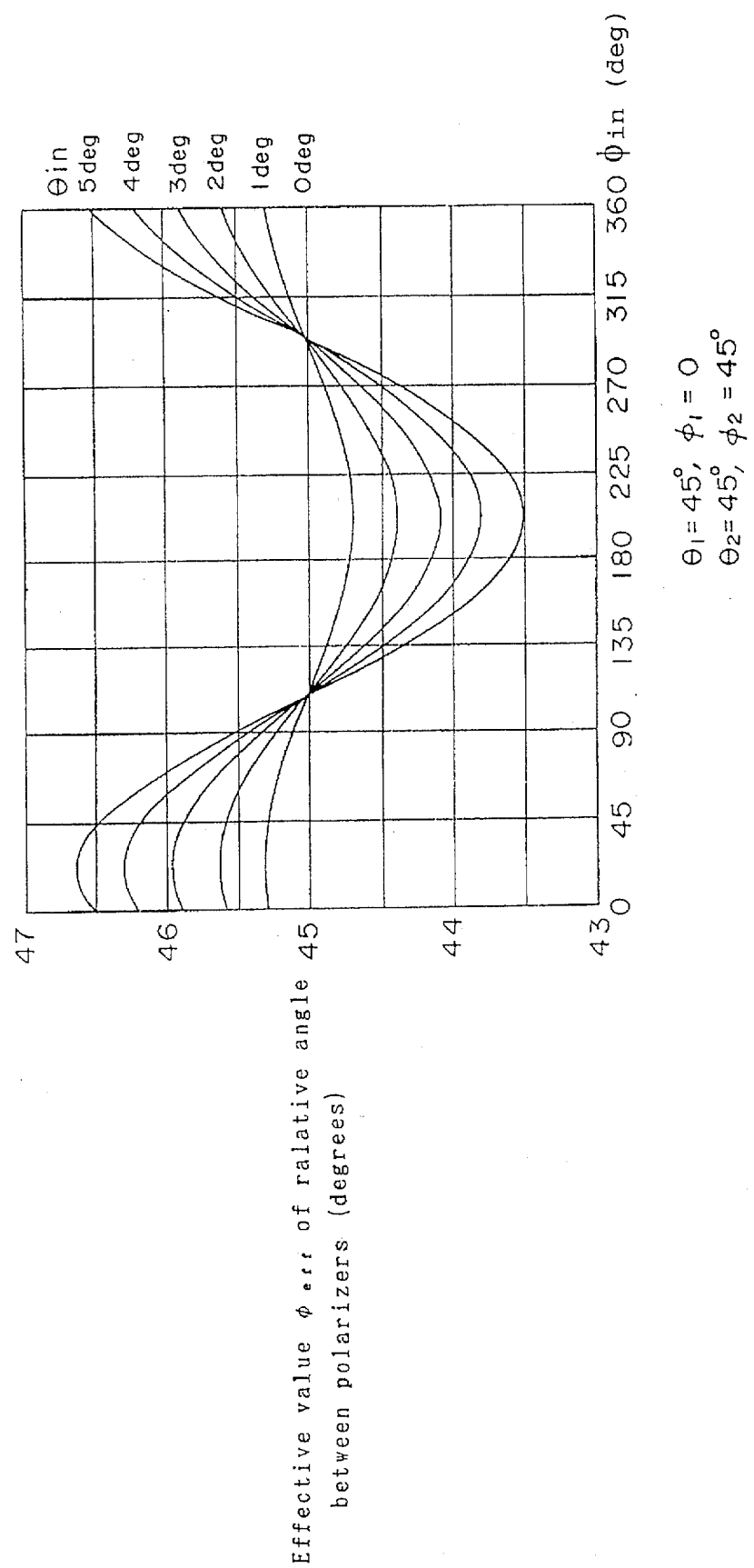
FIG. 2 is a graph showing the relationship between the incident angles θin, φin and the effective value of relative angle of two polarizers.

When the setting of the incidence of laser light shown in FIG. 1 is varied within the range θin≠0° and φin=0°–360°, the value φeff oscillates about θin=0° within a constant width as shown in FIG. 2.

Accordingly, when the optical isolator is mounted on an outer holder, the isolation characteristic can be improved by fixing the isolator element or optical isolator after adjusting φ in to an such an angle that the isolation characteristic is improved.

Incidentally, it is necessary for the angle of φ in to be one of four values at incremental 90° degrees because the polarized light must be incident on the first birefringent plate as an ordinary light or an extraordinary light.

From a further aspect of the present invention, the following solution is provided.

Comparing the case (A) and (C), for example, comparing the case (A) wherein the optical relative angle φeff– of a pair of birefringent plates is set at 45° (clockwise) and the Faraday angle θf– of a Faraday rotator is so set that the plane of polarization of the incident light is rotated by 45° in the clockwise direction, and the case (C) wherein the optical relative angle φeff– of a pair of birefringent plates is set at 45° (clockwise) and the Faraday angle θf+ of a Faraday rotator is so set that the plane of polarization of the incident light is rotated by 45° in the counterclockwise direction, the following is made clear.

In both cases, the optical relative angle φeff– is set at 45° (clockwise) and the Faraday rotation angle is set to cause 45° rotation in the clockwise direction (the case (A)) or is set to cause 45° rotation in the counterclockwise direction (the case (C)). In other words, the difference is only in that one arrangement is that the direction of the magnetic field applied to the Faraday rotator is in the +Z direction of the optical isolator (in the direction of backward light travelling) (the case(A)) and that the other arrangement is that the direction of the magnetic field applied to the Faraday rotator is in the –Z direction of the optical isolator (in the direction of forward light travelling) (the case (C)).

Accordingly, the optical isolator used in the above case (A) or (C) may be used in the other optical isolator by simply changing the direction of the magnetic field applied to the Faraday rotator, once the positions of the semiconductor laser, lens and the optical fiber have been adjusted.

The backward transmissivity Tb in the above cased (A) and (C) is obtained from the equation (8) (for the case (A)) and the equation (10) (for the case (C)).

$$Tb = \cos^2(\theta f + \phi eff) \quad (8)$$

$$Tb = \sin^2(\theta f - \phi eff) \quad (10)$$

Accordingly, when the direction of the magnetic field applied to the Faraday rotator is set in the +Z direction (in the direction of backward light travelling) of the optical isolator (the case(A)), the optical isolation characteristic is improved by minimizing the value $\cos^2(\theta f + \phi eff)$ and when the direction of the magnetic field applied to the Faraday rotator is set in the –Z direction (in the direction of forward light travelling) of the optical isolator (the case(C)), the optical isolation characteristic is improved by minimizing the value $\sin^2(\theta f - \phi eff)$.

Therefore, if $\cos^2(\theta f + \phi eff) < \sin^2(\theta f - \phi eff)$, a better isolation characteristic is obtained when the magnetic field applied to the Faraday rotator is set in the +Z direction, while if $\cos^2(\theta f + \phi eff) > \sin^2(\theta f - \phi eff)$, a better isolation characteristic is obtained when the magnetic field applied to the Faraday rotator is set in the –Z direction.

Also, with respect to θf and φeff, if |θf+φeff–90°|<|θf–φeff|, a better isolation characteristic is obtained when the direction of the magnetic field applied to the Faraday rotator is set in the +Z direction (in the direction of backward light travelling) of the optical isolator, while if |θf+φeff–90°|>|θf–φeff|, a better isolation characteristic is obtained when the direction of the magnetic field applied to the Faraday rotator is set in the –Z direction (in the direction of forward light travelling) of the optical isolator.

Further, taking other settings into consideration, if |θf+φeff–90°|<|θf–φeff|, the direction of the magnetic field is so selected that the forward incident light passes through the first and second birefringent plates both as ordinary lights or both as extraordinary lights, while if |θf+φeff–90°|>|θf–φeff|, the direction of the magnetic field is so selected that the forward incident light passes through the first birefringent plate as an ordinary light and the second birefringent plate as an extraordinary light or the first birefringent plate as an extraordinary light and the second birefringent plate as an ordinary light.

As explained in the forgoing, the isolation characteristic can be improved by appropriately selecting the direction of the magnetic field to be applied to the Faraday rotator, namely, the direction of the magnetization of the Faraday rotator.

It will be evident for those skilled in the art that the present method is effective even in the cases where the directions of the optical axes are different from the above examples, the forward incident light is an extraordinary light, or the birefringent plate and the Faraday rotator are different from the above-mentioned materials. By way of example, when a YIG is used as the Faraday rotator the direction is the magnetic field is reversed, when calcite is used as the birefringent plates the deviation of the position of the light is reversed but the method according to the present invention is still effective. It is noted that although the material for the Faraday rotator may be selected from any materials, those of vertical magnetization type are particularly suitable which have easy axis of magnetization in the direction normal to the light incident and exit surfaces.

Further, the external magnetic field to be applied to the Faraday rotator is required to be sufficiently large to magnetically saturate the magnetization of the Faraday rotator (Saturation of the magnetization of the Faraday rotator stabilizes the Faraday rotation angle).

In the foregoing explanation, the direction of the Faraday rotation was set by the direction of the external magnetic field (from a permanent magnet) but any other means may be used so long as the direction of the Faraday rotation's magnetization is determined by the direction of the external magnetic field. For example, a material is known which maintains the direction of magnetization after an external magnetic field is applied and then removed. If such material is used the Faraday rotator works properly after an external magnetic field is applied to set the direction of the magnetization of the Faraday rotator and then removed.

Explanation of the preferred embodiments

Embodiments of the present application will now be explained.

EXAMPLE 1

An optical isolator was produced by using rutile plates as birefringent plates, a magnetic garnet as Faraday rotator, a permanent magnet as means for applying a magnetic field to saturate the Faraday rotator.

In the construction of the optical isolator shown in FIG. 1, $$\theta_1 = \theta_2 = 45°, \phi_1 = 0° \text{ and } \phi_2 = 45°$$

were adopted.

The case where $\theta_{in} = 4°$, $\phi_{in} = 0°$ was considered. From FIG. 2, we obtain $\phi eff = 46.2°$.

1) The isolator was produced wherein the Faraday rotation angle is in the plus direction so that the forward incident polarized light passes through the first and second rutile plates as an ordinary light and an ordinary light respectively (or as an extraordinary light and an extraordinary light respectively) and the Faraday rotation angle satisfies the following at the central wavelength of use of 1310 nm and at the central temperature of use of 25° C.

$\theta_f=90°-46.2°=43.8°$.

An isolation of 40 dB was obtained.

On the other hand, a light was made incident on this optical isolator from the direction $\theta_{in}=4°$ and $\theta_{in}=180°$ and the isolation was reduced to 27 dB.

Figure 17:
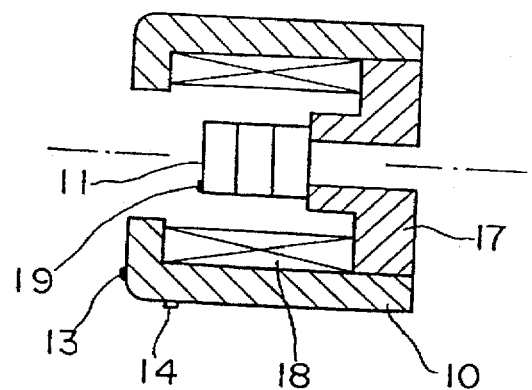
FIG. 17 is a perspective view of an optical isolator on which a mark is formed.

This optical isolator has, for example, a structure shown in FIG. 17. The optical isolator 11 is supported by a cylindrical element holder 17, which, in turn, is supported by an outer shape holder 10. The outer shape holder 10 is provided with an cylindrical permanent magnet 18 for applying a fixed magnetic field to the optical isolator element 11. This optical isolator element 11 has a mark 19 for showing the direction of oblique incident light. Alternatively, a mark 13 is affixed on the front end face of the outer holder, or a mark 14 on the periphery of the front end face of the outer holder (or on both of them) to conveniently prevent an erroneous incident light from entering from the opposite direction.

2) The isolator was produced wherein the Faraday rotation angle is in the minus direction so that the forward incident polarized light passes through the first and second rutile plates as an ordinary light and an extraordinary light respectively (or as an extraordinary light and an ordinary light respectively) and the Faraday rotation angle satisfies at the central wavelength of use of 1310 nm and at the central temperature of use of 25° C.

$\theta_f=46.2°$.

An isolation of 40 dB was obtained.

On the other hand, a light was made incident on this optical isolator from the direction $\theta_{in}=4°$ and $\phi_{in}=180°$ and the isolation was reduced to 27 dB.

On the outer shape holder of this optical isolator, marks similar to those shown in FIG. 17 to show the direction of oblique incidence are affixed to prevent an erroneous light from being incident from the opposite direction.

EXAMPLE 2

In a construction similar to the optical isolator shown in FIG. 1, rutile plates are used as polarizers and $\theta_1=\theta_2=45°$, $\phi_1=0°$, $\phi_2=45°$ and Faraday rotation angel $\phi_f=45°$ were used.

Figure 18:
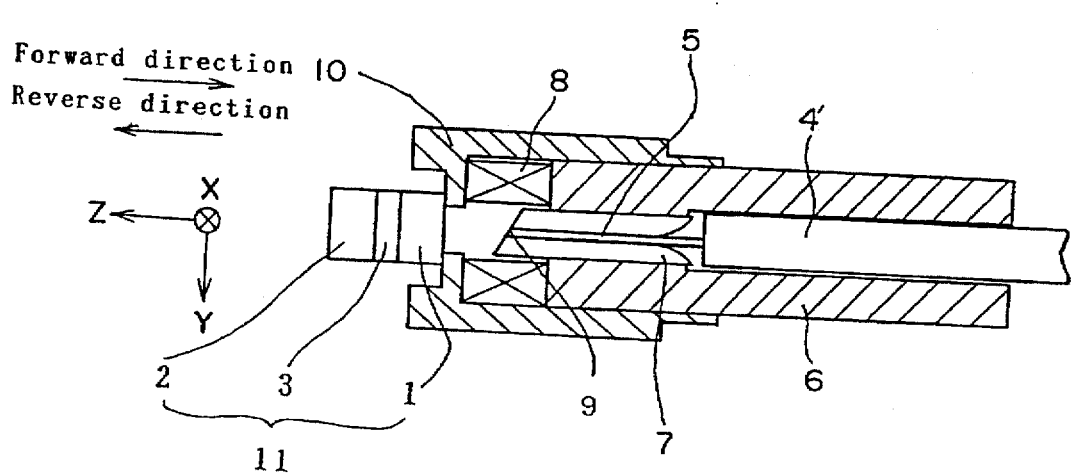
FIG. 18 is a cross sectional view of an embodiment of an optical isolator with a fiber.

This optical isolator was united with an optical fiber to construct an optical isolator provided with an optical fiber as shown in FIG. 18. In FIG. 18, 4' is a optical fiber core, 5 is a bare fiber exposed from the fiber core 4', 6 is a ferrule for supporting the optical fiber, 7 is a ceramic capillary tube, 8 is a permanent magnet for applying a saturation or non-saturation magnetic field to the Faraday rotator, 9 is an oblique end face of the fiber, 10 is a holder formed from a non-magnetic or magnetically soft magnetic material, and 10 is an optical isolator element having a construction shown in FIG. 10.

In FIG. 18, the fiber end face was obliquely set at a degree of 8°. In this case, the incident angles $\theta_{in}$, $\phi_{in}$ were set at about 3.7° and 90°, respectively.

Figure 20:
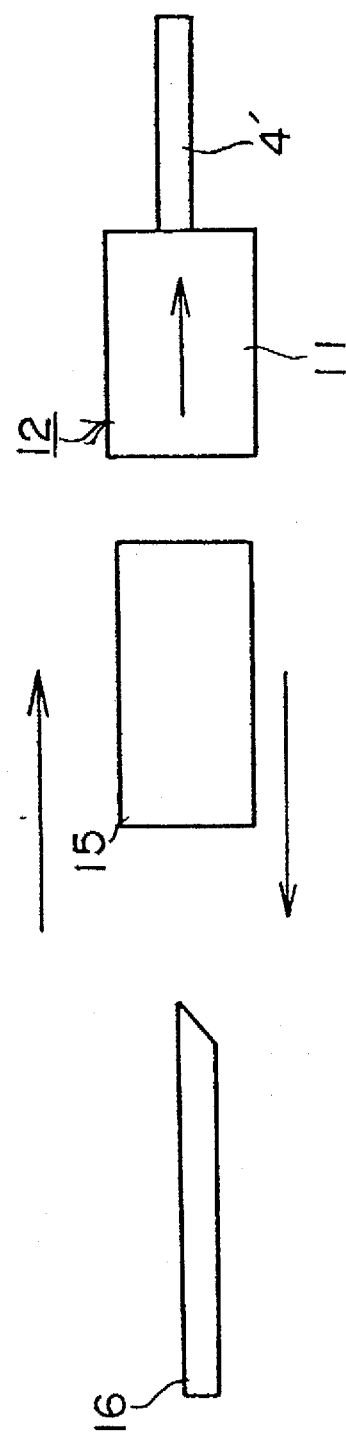
FIG. 20 shows a measurement system for an optical isolator with an optical fiber.

As shown in FIG. 20, a second optical fiber 16 and lens 15 were arranged with respect to the optical isolator 12 having the first fiber and the positions of the various elements were adjusted so that the transmission to the first optical fiber 4' became maximum. With this arrangement, the light entering the first optical fiber 4' (and the optical isolator element 11) was a converging beam having angles $\theta_{in}=3.7°$ and $\phi_{in}=90°$. The property of the optical isolator 12 provided with the optical fiber was evaluated.

Considering here the case where the direction of polarization of the light incident on the optical isolator is in the Y-direction. In order for this incident light having such plane of polarization to pass through the first birefringent plate as an ordinary light or an extraordinary light, the direction of the optical axis $\phi_1$ of the first birefringent plate must be at either one of 0°, 90°, 180° or 270°.

On the other hand, the optical isolator according to the present example, the C-axis (optical axis) is set at $\theta_1=45°$ and $\phi_1=0°$. Accordingly, it is possible to use the optical isolator at an angle rotated by 0°, 90°, 180° or 270° while maintaining the fixed plane of polarization of the incident light. Here, the the directions of the optical axis $\phi_1$ of the first birefringent plate and that $\phi_2$ of the second birefringent plate after the optical isolator element is rotated by 90°, 180° or 270° are as follows.

After rotation of 90°, $\phi_1=90°$, $\phi_2=135°$

After rotation of 180°, $\phi_1=180°$, $\phi_2=225°$

After rotation of 270°, $\phi_1=270°$, $\phi_2=315°$

Also, after rotation of the optical isolator element by 90°, 180° or 270°, the incident direction $\phi_{in}$ is equivalent to the incident laser light at the following angle with respect to the unrotated optical isolator, namely set at $\phi_1=0°$, $\phi_2=45°$.

After rotation of 90°, $\phi_{in}=180°$

After rotation of 180°, $\phi_{in}=270°$

After rotation of 270°, $\phi_{in}=0°$

Also, the effective value of the relative effective optical angle $\phi_{eff}$ varies within a fixed range when the incident direction $\phi_{in}$ is changed. Accordingly, when the optical isolator element is rotated by 90°, 180° or 270°, relative effective optical angle $\phi_{eff}$ varies within a maximum angle of 2° and accordingly the best isolation characteristic is obtained when $\phi_{in}$ is 90° and the isolation characteristic will be deteriorated when the optical isolator is used at other angles.

In addition, as there are variations in the $\theta_f$ and $\phi_{eff}$ owing to the production of the optical isolators, even with an optical isolator element which has been designed to have the optimal isolation characteristic, there may be a case where a better result is obtained when used at a different angle $\phi_{in}$. Accordingly, rotation of the optical isolator element through 90°, 180° or 270° can give a best isolation characteristic and thus can result in improved yield.

Of course, in such case, the positions of the optical laser, lens, and optical fiber will have to be re-adjusted.

The following is the result from the test specimens produced according to the present invention wherein the standard deviation of production variation of the Faraday rotation angle $\theta_f$ was 0.2° and the standard deviation of production variation of the rutile plate was 0.4°.

The isolators were assembled in an orientation of one of the two directions $\phi_1=0°$ and $\phi_2=180°$ in such manner that the isolation is larger than the other and it was found that the standard deviation was only 4.1 nm at the peak wavelength (the wavelength at which the isolation is maximum) and thus a stable optical isolator was obtained.

On the other hand, when specimens were produced without considering the orientation, the standard deviation of production dispersion was 12 nm.

Figure 21:
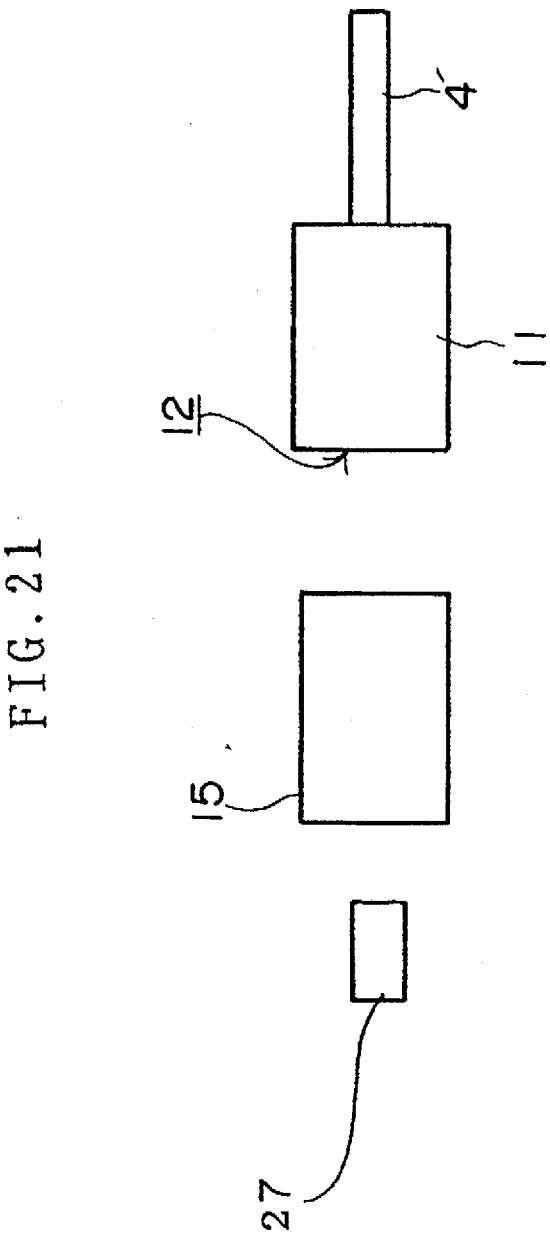
FIG. 21 is a view showing an application in which a semiconductor is combined with an optical isolator with an optical fiber according to the present invention.

A semiconductor laser module was produced which was comprised of an isolator 12 with an optical fiber, a semiconductor laser 27 and a lens 15 as shown in FIG. 21. The positions of the respective elements were so regulated that the coupling efficiency of the semiconductor laser 27 to the optical fiber was maximal. The light inputted to the optical fiber (and accordingly, to the optical isolator) was a converging beam having angles of $\theta_{in}=$about 3.7° and $\phi_{in}=90°$. With this arrangement, the direction of the light beam which the optical fiber can receive with a maximum efficiency is uniquely determined and accordingly the direction shown in FIG. 20 is naturally be determined when the various elements are assembled as in FIG. 21.

Accordingly, the optimized characteristic of the optical isolator as described in the foregoing was also substantially materialized and thus a stable dynamic operation as a semiconductor laser module was materialized.

Figure 22:
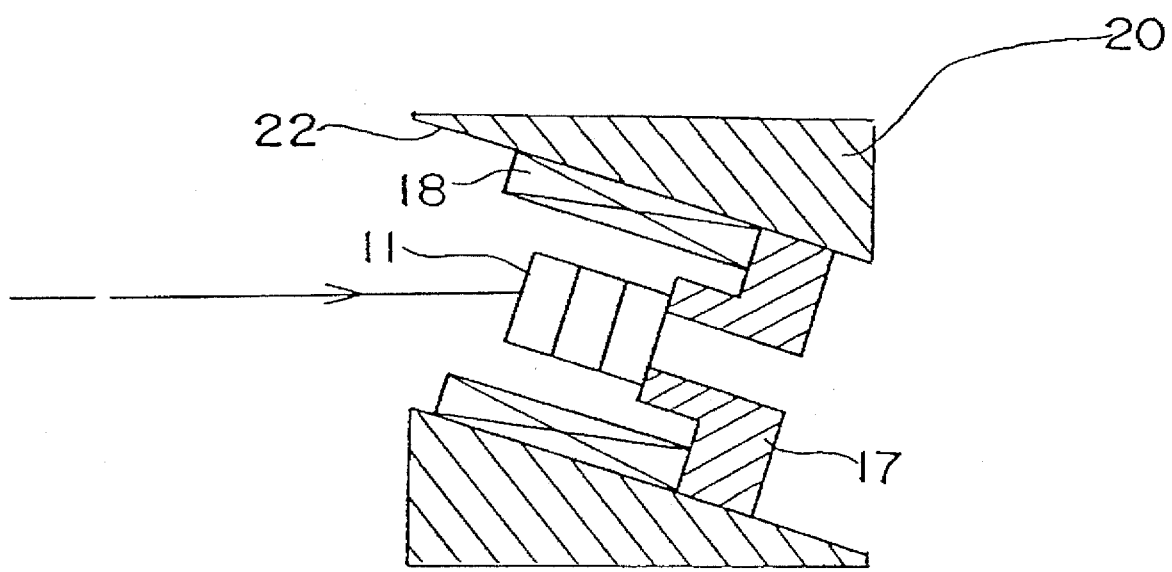
FIG. 22 is a cross sectional view of another embodiment of the present invention which makes the outer holder 20 as small as possible.

FIG. 22 illustrates another embodiment, in which the outer shape holder 20 has a rectangular, square or cylindrical shape and the outer periphery is in parallel with the incident direction of the light. On the inner surface of the outer shape holder is formed a slanted surface 22 on which a permanent magnet 18 is fixed. Also an optical isolator element 11 is obliquely mounted thereon by means of an element attachment member 17. The oblique angle coincides with the oblique angle of the light as discussed in connection with the embodiment shown in FIG. 17.

In this example, it is sufficient for the incident light to travel along the axis of the outer shape holder and there is no need of indicating the direction of the light incidence.

According to these embodiments, it is possible to set the optical isolator in such manner that the isolation becomes maximum at the oblique incidence angle.

Further, according to the present invention, an optical fiber and an optical isolator element can be combined to achieve the maximum isolation when the light is incident in the oblique direction and an easy setting of an optimum arrangement can be achieved when other necessary elements such as laser source or other associated elements are assembled.

EXAMPLE 3

This example shows an example of maximizing the isolation by reversing the direction of the magnetic filed to be applied to the Faraday rotator.

The optical isolator is usually designed to have angles $\theta_f=45°$ and $\phi eff=45°$ at the central temperature of use and the central wavelength of use. However, angle deviation are experienced due to various causes. For example, a case where $\theta f$ and $\phi eff$ are respectively deviated by $\pm 1°$ at the maximum due to the process fluctuation.

Table 1(a) shows the result of calculation for $|\theta f+\phi eff-90°|$ and (b) shows the result of calculation for $|\theta f-\phi eff|$. In both cases, the larger this value, the smaller is the isolation. The worst values for each of these cases are 2° and the worst value for the isolation is 29 dB. Further, for the case $|\theta f+\phi eff-90°|$ (Table 1(a)) and the case $|\theta f-\phi eff|$ (Table 1(b)), the combination of the $\theta f$ and $\phi eff$ are not coincident when this value is the worst 2° or the isolation is the worst 29 dB.

Accordingly, as shown in Table 1(c), when the smaller one of the value $|\theta f+\phi eff-90°|$ and the value $|\theta f-\phi eff|$ is selected, the worst value is 1° and the worst isolation is also improved to 35 dB (improvement of 6 dB). Since the selection of one of $|\theta f+\phi eff-90°|$ and $|\theta f-\phi eff|$ is done by the selection of the direction of the magnetic field applied to the Faraday rotator and accordingly the isolation characteristic is determined by setting of the magnetic field.

TABLE 1(a)

$|\theta f + \phi eff - 90°|$

| | | \multicolumn{5}{c}{$\phi$ eff(deg)} |
|---|---|---|---|---|---|---|
| | | 44.0 | 44.5 | 45.0 | 45.5 | 46.0 |
| $\theta f$ (deg) | 44.0 | 2.0 | 1.5 | 1.0 | 0.5 | 0.0 |
| | 44.5 | 1.5 | 1.0 | 0.5 | 0.0 | 0.5 |
| | 45.0 | 1.0 | 0.5 | 0.0 | 0.5 | 1.0 |
| | 45.5 | 0.5 | 0.0 | 0.5 | 1.0 | 1.5 |
| | 46.0 | 0.0 | 0.5 | 1.0 | 1.5 | 2.0 |

TABLE 1(b)

$|\theta f - \phi eff|$

| | | \multicolumn{5}{c}{$\phi$ eff(deg)} |
|---|---|---|---|---|---|---|
| | | 44.0 | 44.5 | 45.0 | 45.5 | 46.0 |
| $\theta f$ (deg) | 44.0 | 0.0 | 0.5 | 1.0 | 1.5 | 2.0 |
| | 44.5 | 0.5 | 0.0 | 0.5 | 1.0 | 1.5 |
| | 45.0 | 1.0 | 0.5 | 0.0 | 0.5 | 1.0 |
| | 45.5 | 1.5 | 1.0 | 0.5 | 0.0 | 0.5 |
| | 46.0 | 2.0 | 1.5 | 1.0 | 0.5 | 0.0 |

TABLE 1(c)

Values for the smaller ones of
$|\theta f + \phi eff - 90°|$ and $|\theta f - \phi eff|$

| | | \multicolumn{5}{c}{$\phi$ eff(deg)} |
|---|---|---|---|---|---|---|
| | | 44.0 | 44.5 | 45.0 | 45.5 | 46.0 |
| $\theta f$ (deg) | 44.0 | 0.0 | 0.5 | 1.0 | 0.5 | 0.0 |
| | 44.5 | 0.5 | 0.0 | 0.5 | 0.0 | 0.5 |
| | 45.0 | 1.0 | 0.5 | 0.0 | 0.5 | 1.0 |
| | 45.5 | 0.5 | 0.0 | 0.5 | 0.0 | 0.5 |
| | 46.0 | 0.0 | 0.5 | 1.0 | 0.5 | 1.0 |

Next, actual embodiment of use will be explained in the following.

Figure 23:
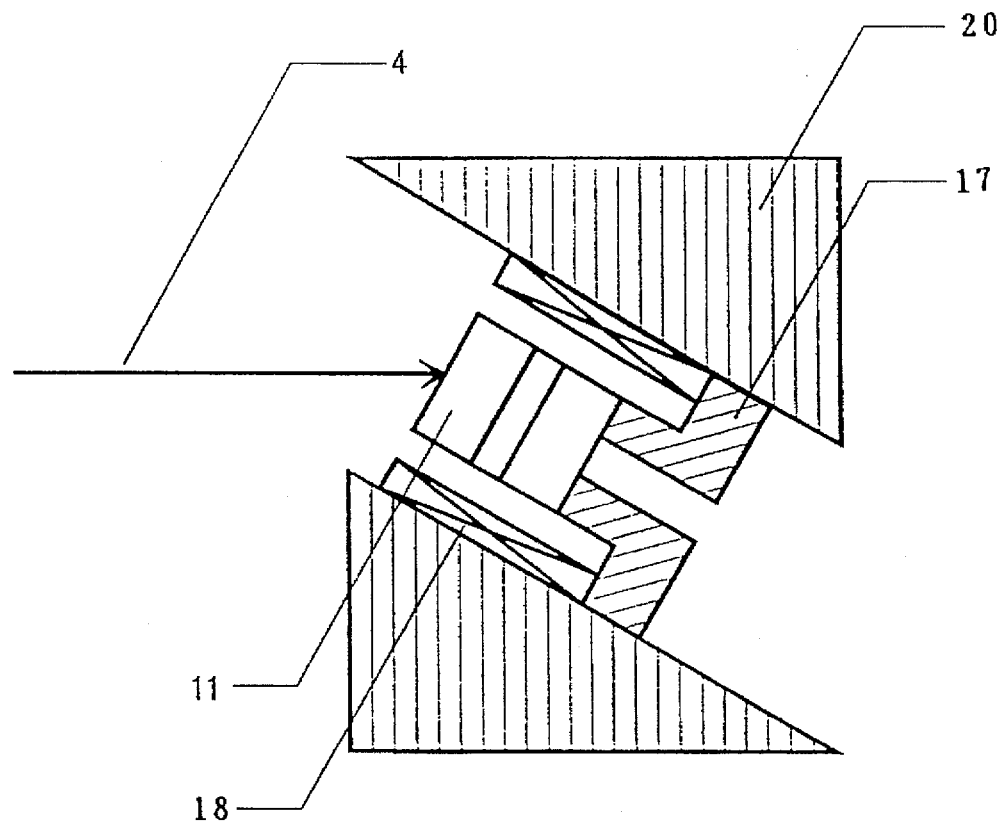
FIG. 23 is a view of an optical isolator element fixed to a holder.

First of all, rutile plates of 10 mm in length, 11 mm in width and 0.8 mm in thickness were prepared as birefringent plates and a Bi-substituted rare earth iron garnet of 10 mm in length, 11 mm in width and 0.3 mm in thickness was prepared as a Faraday rotator. They were bonded in the order of the birefringent plate, the Faraday rotator, and the birefringent plate (Hereinafter called "large surface area optical isolator plate). In this case, the directions of the C-axes (optical axes) were designed to give $\theta 1=\theta 2=45$, $\phi 1=0°$, $\phi 2=-46.1°$. These design values satisfy the condition that $\phi eff=45°$ when the direction of the incident light is set at $\theta in=7.7°$ and $\phi in=90°$. Also, the Faraday rotator was designed to have a Faraday rotation angle $\theta f=45°$. This large surface area optical isolator element was cut into 56 optical isolator elements of 1 mm by 1.3 mm size. Then, the optical isolator 11 was fixed by solder to a element attachment member 17 as shown in FIG. 23 and the attachment member 17 was fixed by laser welding to the outer shape holder 20. It is noted that the incident angle takes the angle as designed when the incident light travels in the direction parallel to the central axis of the outer shape holder 20.

Thereafter, the direction of the permanent magnet 18 was reversed and the isolations were measured and the permanent magnet 18 was adhesively fixed to the element attachment member 17 in the orientation that the isolation was larger. Evaluation results on fifteen specimens of thusly prepared optical isolator elements (Three optical isolator elements were each selected from five large surface area optical isolators) are listed in Table 2.

Due to various production fluctuations, the isolation is necessarily deteriorated but the process according to the present invention satisfied 34 dB or more. On the other hand, the conventional process only provided a yield of 73%–80% with which an isolation of 34 dB or more is obtained and thus a stable isolation characteristic was not obtained.

Also, from this evaluation result, it is seen that the direction of the magnetic field giving a good isolation characteristic and the direction of the magnetic field for the smaller one of |θf+φeff−90°| (The direction of the magnetic field is +) and |θf−φeff| (The direction of the magnetic field is −) generally coincide with each other. Incidentally, there may be a case where |θf+φeff−90°| has almost the same value as |θf−φeff| and in this case the direction of the magnetic field for a better isolation does not necessarily coincide with the magnetic field for the smaller value of the |θf+φeff−90°| and |θf−φeff|. However, in this case, the isolation is substantially the same regardless of the selection of the direction of the magnetic field.

condition that the isolator elements are fixed on element attachment members after they are cut into the designed shapes from large surface area optical isolator element and accordingly optical isolators of a good isolation characteristic can be stably produced at a low cost.

What we claim is:

1. An optical isolator including first and second birefringent plates so arranged that the plane of polarization of a light passing through the first birefringent plate as an ordinary light and the plane of polarization of a light passing through the second birefringent plate as an ordinary light are non-parallel with each other and a Faraday rotator inserted between the first and second birefringent plates for rotating the plane of polarization of a light incident on the Faraday rotator through a fixed angle, characterized in that the angles of the optical axes of the first and second birefringent plates are so set that a forward incident polarized light passes through the first and second birefringent plates both as ordinary lights or both as extraordinary lights, and the relationships $\phi \neq \phi_{ef}$ and $\theta_f + \phi_{ef} = 90°$, are satisfied when an actually used incident polarized light is incident in an oblique direction, where $\phi$ is the angle between the plane of polarization of the light passing through the first bire-

TABLE 2

| Large surface area el. | Element No. | φeff(deg) | Faraday rot. angle θf(deg) | Isolation (dB) at 1310 nm | | | Better direction of magnet | \|θf + φeff − 90°\| +Direction of magnet | \|θf − φeff\| −Direction of magnet | Direction of magnet of smaller angle deviation |
|---|---|---|---|---|---|---|---|---|---|---|
| | | | | +Direction of magnet | −Direction of magnet | Invention | | | | |
| 1 | 1 | 43.7 | 45.7 | 38.1 | 29.5 | 38.1 | + | 0.6 | 2.0 | + |
| | 6 | 43.7 | 45.6 | 38.0 | 29.6 | 38.0 | + | 0.7 | 1.9 | + |
| | 22 | 43.9 | 45.5 | 38.1 | 30.8 | 38.1 | + | 0.6 | 1.6 | + |
| 2 | 1 | 45.9 | 45.0 | 34.6 | 35.6 | 35.6 | − | 0.9 | 0.9 | same for both |
| | 10 | 45.9 | 45.0 | 34.6 | 34.4 | 34.6 | + | 0.9 | 0.9 | same for both |
| | 20 | 46.0 | 45.3 | 32.6 | 37.1 | 37.1 | − | 1.3 | 0.7 | − |
| 3 | 3 | 45.0 | 44.4 | 38.9 | 39.1 | 39.1 | − | 0.6 | 0.6 | same for both |
| | 15 | 44.3 | 44.2 | 31.3 | 41.4 | 41.4 | − | 1.5 | 0.1 | − |
| | 30 | 44.6 | 44.2 | 32.8 | 37.2 | 37.2 | − | 1.2 | 0.4 | − |
| 4 | 1 | 45.3 | 45.3 | 35.1 | 41.0 | 41.0 | − | 0.6 | 0.0 | − |
| | 20 | 44.6 | 45.2 | 42.2 | 38.2 | 42.2 | + | 0.2 | 0.6 | + |
| | 40 | 45.3 | 45.0 | 42.5 | 42.3 | 42.5 | + | 0.3 | 0.3 | same for both |
| 5 | 5 | 45.0 | 45.1 | 42.0 | 43.2 | 43.2 | − | 0.1 | 0.1 | same for both |
| | 26 | 45.0 | 45.2 | 39.8 | 42.2 | 42.2 | − | 0.2 | 0.2 | same for both |
| | 52 | 45.5 | 45.7 | 32.7 | 43.6 | 43.6 | − | 1.2 | 0.2 | − |
| Yield of product having isolation of 34 dB or more | | | | 73% | 80% | 100% | | | | |

Figure 24:
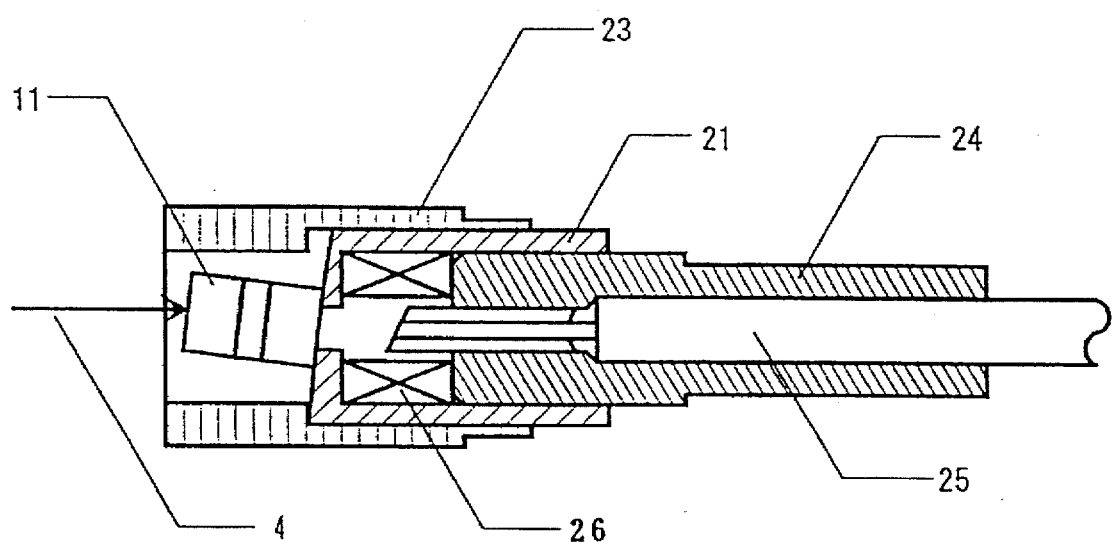
FIG. 24 is a view showing an optical isolator element.
Figure 25:
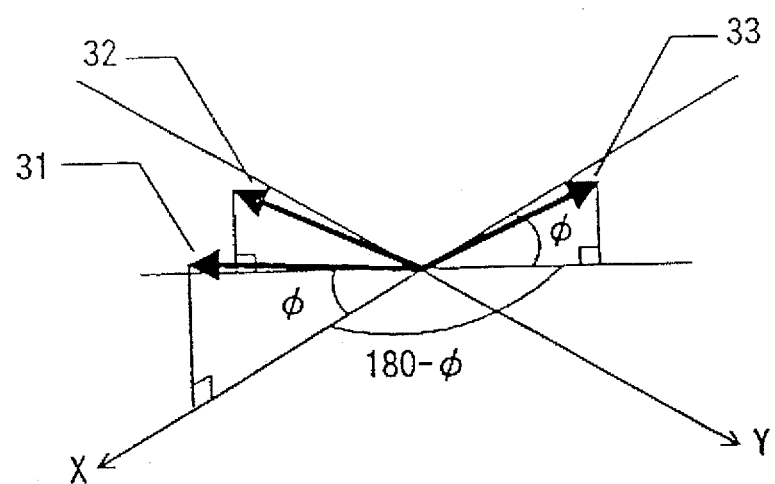
FIG. 25 is a view showing the relationship between the C-axes (optical axes) of the first and birefringent plates.
Figure 26A:
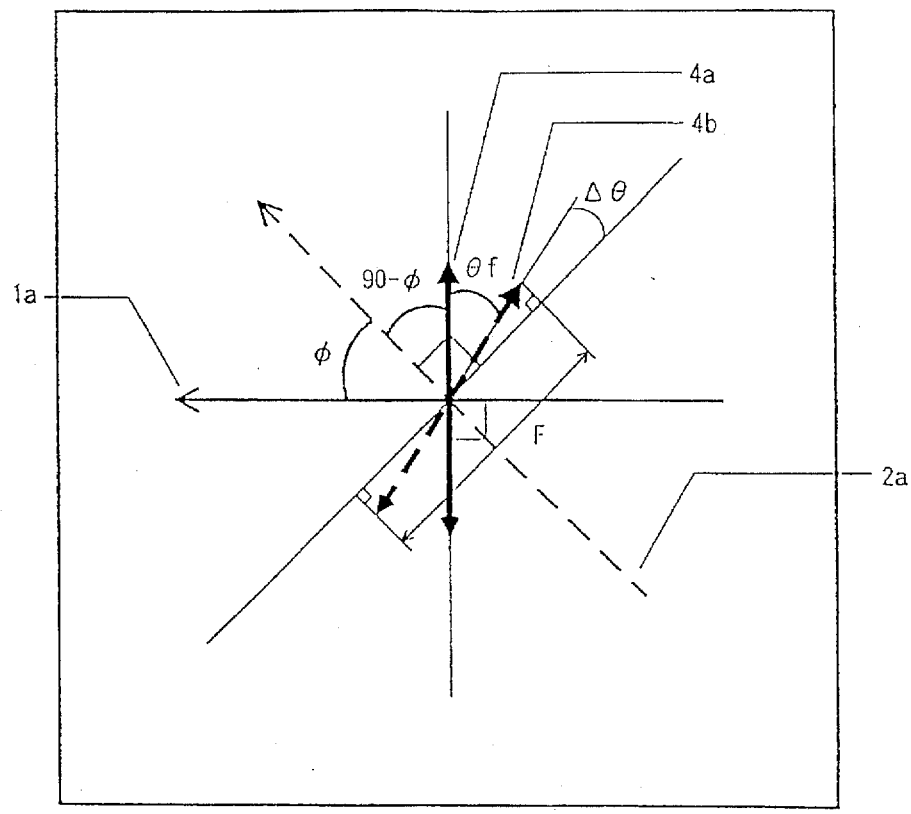
FIGS. 26(a) and 26(b) are a view explaining the forward transmissivity Tf and the reverse transmissivity Tb.
Figure 26B:
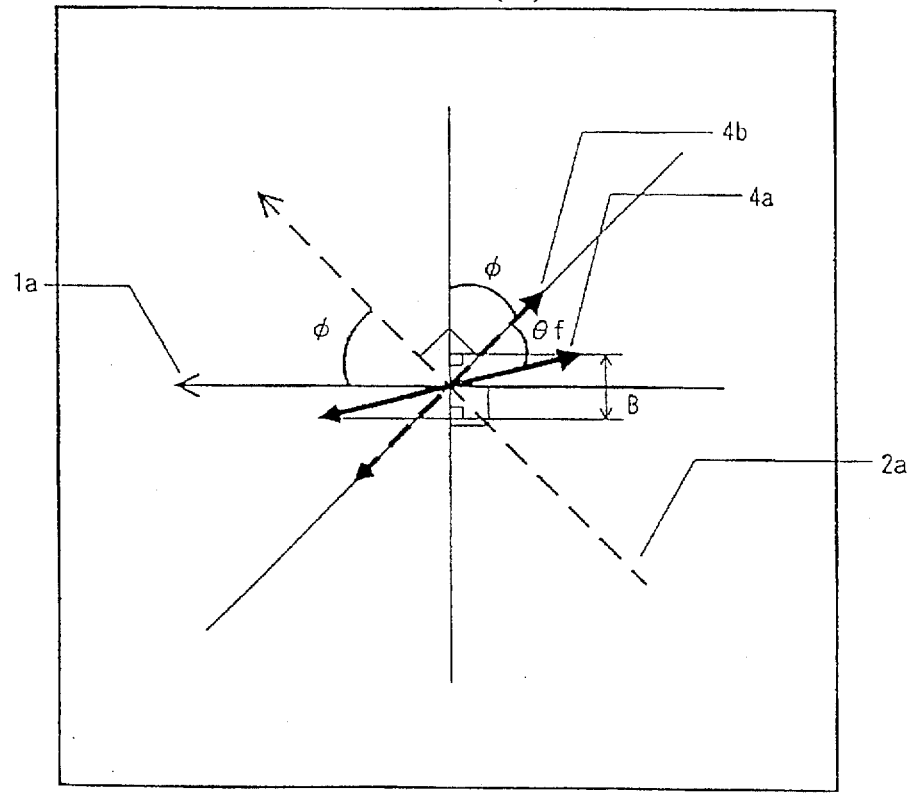
Figure 27A:
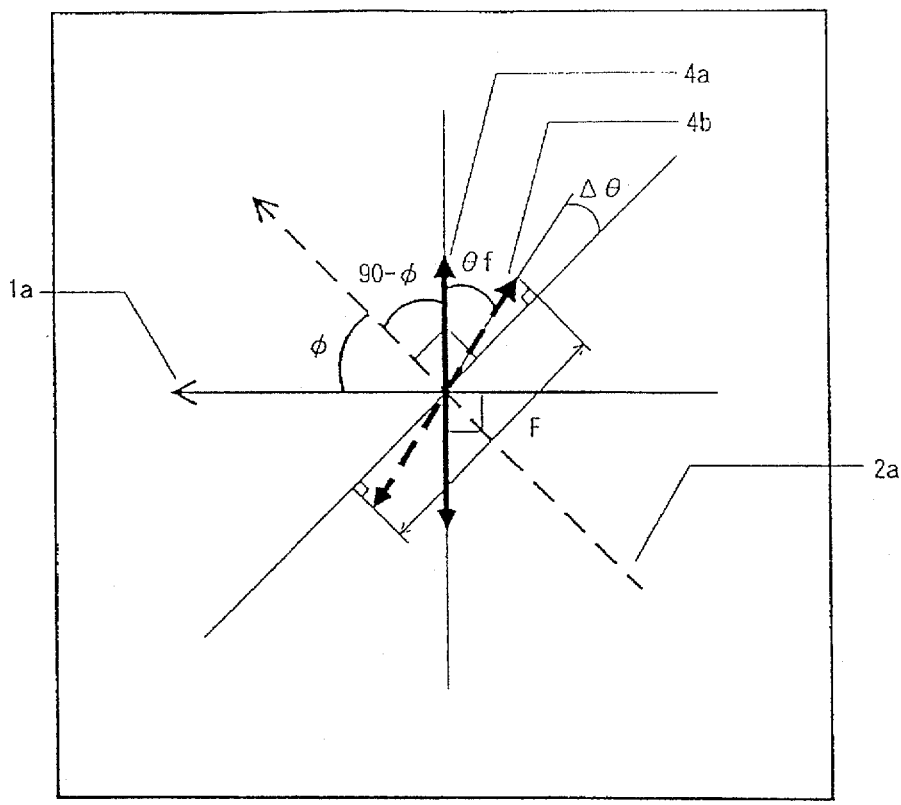
FIGS. 27(a) and 27(b) are a view explaining the forward transmissivity Tf and the reverse transmissivity Tb.
Figure 27B:
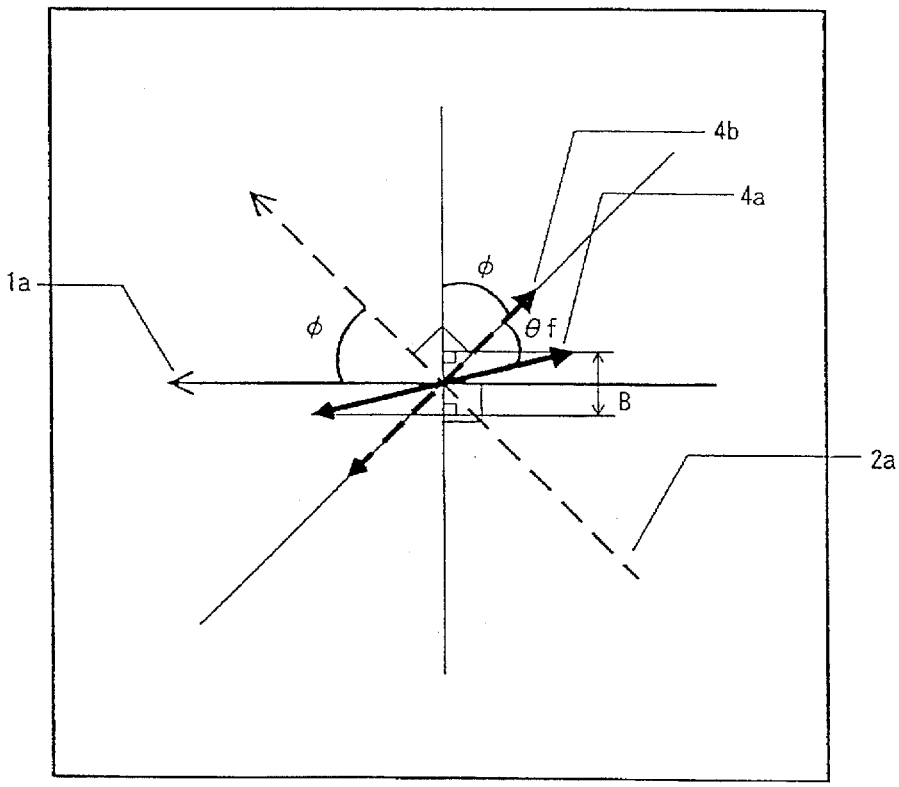

Thirty specimens of optical isolator elements similar to the above ones (Three optical elements were selected from each of ten large surface area optical isolator elements) were prepared and fixedly mounted on the element holder 21 shown in FIG. 24 by solder with a slant angle of 4°. Next, the element attachment member 21 having the optical isolator element 11 was temporarily fixed on the ferrule 24 on which the optical fiber 25 and the permanent magnet 26 were mounted, with a slant angle of the fiber end face of 8°.

In this condition, a light was projected at an incident angle at which the isolation became the maximum, and the isolation was measured with two directions of the magnetic field. Then, the element attachment member 21 having the optical isolator element 11 was permanently fixed on the ferrule 24 on which the optical fiber 25 and the permanent magnet 26 were mounted. As a result, for all optical isolators with optical fibers a stable isolation of 35 dB or more was attained.

From the foregoing examples, the isolation characteristic can be adjusted by the direction of the magnetic field in a fringent plate as an ordinary light and the plane of polarization of the light passing through the second birefringent plate as an ordinary light when a light is incident on the first birefringent plate in the direction normal to the first birefringent plate, where $\phi_{ef}$ is the angle between the plane of polarization of the light passing through the first birefringent plate as an ordinary light and the plane of polarization of the light passing through the second birefringent plate as an ordinary light when said actually used forward incident polarized light is incident in said oblique direction, and where $\theta_f$ is the angle of Faraday rotation of said Faraday rotator at its central temperature of use and at its central wavelength of use.

2. An optical isolator including first and second birefringent plates so arranged that the plane of polarization of a light passing through the first birefringent plate as an ordinary light and the plane of polarization of a light passing through the second birefringent plate as an ordinary light are non-parallel with each other and a Faraday rotator inserted between the first and second birefringent plates for rotating the plane of polarization of a light incident on the Faraday rotator through a fixed angle, characterized in that, the angles of the optical axes of the first and second birefringent plates are so set that a forward incident polarized light passes through one of the first and second birefringent plates as an ordinary light and the other birefringent plate as an extraordinary light, and the relationships $\phi \neq \phi_{ef}$ and $\theta_f = \phi_{ef}$ are satisfied when an actually used incident polarized light is incident in an oblique direction, where $\phi$ is the angle between the plane of polarization of the light passing through the first birefringent plate as an ordinary light and the plane of polarization of the light passing through the second birefringent plate as an ordinary light when a light is incident on the first birefringent plate in the direction normal to the first birefringent plate, where $\phi_{ef}$ is the angle between the plane of polarization of the light passing through the first birefringent plate as an ordinary light and the plane of polarization of the light passing through the second birefringent plate as an ordinary light when said actually used forward incident polarized light is incident in said oblique direction, and where $\theta_f$ is the angle of Faraday rotation of said Faraday rotator at its central temperature of use and at its central wavelength of use.

3. An optical isolator according to claim 1, wherein a mark showing the direction of light incidence is formed on the optical isolator at a position which does not interfere with passage of the light.

4. An optical isolator according to claim 2, wherein a mark showing the direction of light incidence is formed on the optical isolator at a position which does not interfere with passage of the light.

5. An optical isolator including first and second birefringent plates so arranged that the plane of polarization of a light passing through the first birefringent plate as an ordinary light and the plane of polarization of a light passing through the second birefringent plate as an ordinary light are non-parallel with each other and a Faraday rotator inserted between the first and second birefringent plates for rotating the plane of polarization of a light incident on the rotator through a fixed angle, the angles of the optical axes of the first and second birefringent plates being so set that a forward incident polarized light passes through the first and second birefringent plates both as ordinary lights or both as extraordinary lights, characterized in that the optical isolator is so adjusted in position that the value $|\theta_f + \phi_{ef} - 90°|$ prior to rotation of at least one of 90°, 180° and 270° from the adjusted position is less than the value $|\theta_f + \phi_{ef} - 90°|$ after the rotation from the adjusted position about an axis normal to the incident surface of the optical isolator element, where $\phi_{ef}$ is the angle between the plane of polarization of the light passing through the first birefringent plate as an ordinary light and the plane of polarization of the light passing through the second birefringent plate as an ordinary light and that $\theta_f$ is the angle of the Faraday rotation of said Faraday rotator at its central temperature of use and its central wavelength of use.

6. An optical isolator including first and second birefringent plates so arranged that the plane of polarization of a light passing through the first birefringent plate as an ordinary light and the plane of polarization of a light passing through the second birefringent plate as an ordinary light are non-parallel with each other and a Faraday rotator inserted between the first and second birefringent plates for rotating the plane of polarization of a light incident on the rotator through a fixed angle, the angles of the optical axes of the first and second birefringent plates being so set that a forward incident polarized light passes through one of the first and second birefringent plates as an ordinary light and the other birefringent plate as an extraordinary light, characterized in that the optical isolator is so adjusted in position that the value $|\theta_f - \phi_{ef}|$ prior to rotation of at least one of 90°, 180° and 270° from the adjusted position is less than the value $|\theta_f - \phi_{ef}|$ after the rotation from the adjusted position about an axis normal to the incident surface of the optical isolator element, where $\phi_{ef}$ is the angle between the plane of polarization of the light passing through the first birefringent plate as an ordinary light and the plane of polarization of the light passing through the second birefringent plate as an ordinary light and that $\theta_f$ is the angle of the Faraday rotation of said Faraday rotator at its central temperature of use and at its central wavelength of use of the Faraday rotator.

7. An optical isolator including an optical isolator element and an optical fiber having an oblique end surface integrally formed with said optical isolator element, said optical isolator element including first and second birefringent plates so arranged that the plane of polarization of a light passing through the first birefringent plate as an ordinary light and the plane of polarization of a light passing through the second birefringent plate as an ordinary light are non-parallel with each other and a Faraday rotator inserted between the first and second birefringent plates for rotating the plane of polarization of a light incident on the rotator through a fixed angle, the angles of the optical axes of the first and second birefringent plates being so set that a forward incident polarized light passes through the first and second birefringent plates both as ordinary lights or both as extraordinary lights, characterized in that the optical isolator is so adjusted in position that the value $|\theta_f + \phi_{ef} - 90°|$ prior to rotation of at least one of 90°, 180° and 270° from the adjusted position is less than the value $|\theta_f + \phi_{ef} - 90°|$ after the rotation from the adjusted position about an axis normal to the incident surface of the optical isolator element, where $\phi_{ef}$ is the angle between the plane of polarization of the light passing through the first birefringent plate as an ordinary light and the plane of polarization of the light passing through the second birefringent plate as an ordinary light and that $\theta_f$ is the angle of the Faraday rotation of said Faraday rotator at its central temperature of use and at its central wavelength of use.

8. An optical isolator including an optical isolator element and an optical fiber having an oblique end surface integrally formed with said optical isolator element, said optical isolator element including first and second birefringent plates so arranged that the plane of polarization of a light passing through the first birefringent plate as an ordinary light and the plane of polarization of a light passing through the second birefringent plate as an ordinary light are non-parallel with each other and a Faraday rotator inserted between the first and second birefringent plates for rotating the plane of polarization of a light incident on the rotator through a fixed angle, the angles of the optical axes of the first and second birefringent plates being so set that a forward incident polarized light passes through one of the first and second birefringent plates as an ordinary light and the other birefringent plate as an extraordinary light, characterized in that the optical isolator is so adjusted in position that the value $|\theta_f - \phi_{ef}|$ prior to rotation of at least one of 90°, 180° and 270° from the adjusted position is less than the value $|\theta_f-\phi_{eff}|$ after the rotation from the adjusted position about an axis normal to the incident surface of the optical isolator element, where $\phi_{eff}$ is the angle between the plane of polarization of the light passing through the first birefringent plate as an ordinary light and the plane of polarization of the light passing through the second birefringent plate as an ordinary light and that $\theta_f$ is the angle of the Faraday rotation of said Faraday rotator at its central temperature of use and at its central wavelength of use.

9. An optical isolator including a first and second birefringent plates so arranged that the plane of polarization of a light passing through the first birefringent plate as an ordinary light and the plane of polarization of a light passing through the second birefringent plate as an ordinary light are non-parallel with each other and a Faraday rotator inserted between the first and the second birefringent plates for rotating the plane of polarization of a light incident on the rotator through a fixed angle, characterized in that, if $|\theta f+\phi eff-90°|<|\theta f-\phi eff|$ is satisfied, the direction of the magnetization of the Faraday rotator is so set that the forward incident polarized light passes through the first and second birefringent plates both as ordinary lights or both as extraordinary lights, and if $|\theta f+\phi eff-90°|>|\theta f-\phi eff|$ is satisfied the direction of the magnetization of the Faraday rotator is so set that the forward incident polarized light passes through one of the first and second birefringent plates as an ordinary light and the other birefringent plate as an extraordinary light, when an actually used incident polarized light is incident in a particular direction, $\phi_{eff}$ (selected to satisfy 0°<$\phi$eff<90°) is the angle between the plane of polarization of the light passing through the first birefringent plate as an ordinary light and the plane of polarization of the light passing through the second birefringent plate as an ordinary light and that $\theta_f$ (selected to satisfy 0°<$\theta f$<90°) is the angle of the Faraday rotation of said Faraday rotator at its central temperature of use and at its central wavelength of use.

10. A method for manufacturing an optical isolator including a first and second birefringent plates so arranged that the plane of polarization of a light passing through the first birefringent plate as an ordinary light and the plane of polarization of a light passing through the second birefringent plate as an ordinary light are non-parallel with each other and a Faraday rotator inserted between the first and the second birefringent plates for rotating the plane of polarization of a light incident on the rotator through a fixed angle, characterized in that the method comprises allowing an actually used polarized light to be incident on the optical isolator, measuring an isolation characteristic in a condition that the direction of magnetization of the Faraday rotator is so selected to allow the incident polarized light to pass through the first and second plates both as ordinary lights or both as extraordinary lights, measuring an isolation characteristic in a condition that the direction of the magnetization of the Faraday rotator is so selected to allow the incident polarized light to pass through one of the first and second birefringent plates as ordinary light and the other birefringent plate as an extraordinary light, comparing two values from the measurements and fixing the direction of the magnetization to one which gives a better isolation characteristic.

11. An optical isolator including an optical isolator element and an optical fiber having an oblique end surface integrally formed with said optical isolator element, said optical isolator element including a first and second birefringent plates so arranged that the plane of polarization of a light passing through the first birefringent plate as an ordinary light and the plane of polarization of a light passing through the second birefringent plate as an ordinary light are non-parallel with each other and a Faraday rotator inserted between the first and the second birefringent plates for rotating the plane of polarization of a light incident on the rotator through a fixed angle, characterized in that, if $|\theta f+\phi eff-90°|<|\theta f-\phi eff|$ is satisfied, the direction of the magnetization of the Faraday rotator is so set that the forward incident polarized light passes through the first and second birefringent plates both as ordinary lights or both as extraordinary lights, and if $|\theta f+\phi eff-90°|>|\theta f-\phi eff|$ is satisfied the direction of the magnetization of the Faraday rotator is so set that the forward incident polarized light passes through one of the first and second birefringent plates and the other birefringent plate as an extraordinary light, when an actually used incident polarized light is incident in a particular direction, where $\phi_{eff}$ (selected to satisfy 0°<$\phi$eff<90°) is the angle between the plane of polarization of the light passing through the first birefringent plate as an ordinary light and the plane of polarization of the light passing through the second birefringent plate as an ordinary light and that $\theta_f$ (selected to satisfy 0°<$\theta f$<90°) is the angle of the Faraday rotation of said Faraday rotator at its central temperature of use and at its central wavelength of use.

12. A method for manufacturing an optical isolator including an optical isolator element and an optical fiber having an oblique end surface integrally formed with said optical isolator element, said optical isolator element including a first and second birefringent plates so arranged that the plane of polarization of a light passing through the first birefringent plate as an ordinary light and the plane of polarization of a light passing through the second birefringent plate as an ordinary light are non-parallel with each other and a Faraday rotator inserted between the first and the second birefringent plates for rotating the plane of polarization of a light incident on the rotator through a fixed angle, characterized in that the method comprises allowing an actually used polarized light to be incident on the optical isolator, measuring an isolation characteristic in a condition that the direction of magnetization of the Faraday rotator is so selected to allow the incident polarized light to pass through the first and second plates both as ordinary lights or both as extraordinary lights, measuring an isolation characteristic in a condition that the direction of the magnetization of the Faraday rotator is so selected to allow the incident polarized light to pass through one of the first and second birefringent plates as an ordinary light and the other birefringent plate as an extraordinary light, comparing two values from the measurements and fixing the direction of the magnetization to one which gives a better isolation characteristic.

\* \* \* \* \*